(12) United States Patent
Lee et al.

(10) Patent No.: US 10,129,235 B2
(45) Date of Patent: Nov. 13, 2018

(54) KEY HIERARCHY FOR NETWORK SLICING

(71) Applicant: QUALCOMM Incorporated, San Diego, CA (US)

(72) Inventors: Soo Bum Lee, San Diego, CA (US); Anand Palanigounder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 216 days.

(21) Appl. No.: 15/093,537

(22) Filed: Apr. 7, 2016

(65) Prior Publication Data

US 2017/0111339 A1    Apr. 20, 2017

Related U.S. Application Data

(60) Provisional application No. 62/242,961, filed on Oct. 16, 2015.

(51) Int. Cl.
| | |
|---|---|
| *H04L 29/06* | (2006.01) |
| *H04L 9/08* | (2006.01) |
| *H04W 12/04* | (2009.01) |
| *H04W 12/06* | (2009.01) |
| *H04L 9/00* | (2006.01) |

(52) U.S. Cl.
CPC ............. *H04L 63/08* (2013.01); *H04L 9/00* (2013.01); *H04L 9/0866* (2013.01); *H04L 63/06* (2013.01); *H04W 12/04* (2013.01); *H04W 12/06* (2013.01)

(58) Field of Classification Search
CPC ...................................................... H04L 63/08
See application file for complete search history.

(56) References Cited

U.S. PATENT DOCUMENTS 8,875,232 B2    10/2014    Blom et al.
8,886,935 B2    11/2014    Ohba et al.
9,251,315 B2 *   2/2016    King ....................... G06F 21/00
(Continued)

OTHER PUBLICATIONS

3rd Generation Partnership Project; Technical Specification Group Services and System Aspects; 3GPP System Architecture Evolution (SAE); Security Architecture; (Release 12), 3GPP Standard; 3GPP TS 33.401, 3rd Generation Partnership Project (3GPP), Mobile Competence Centre; 650, Route Des Lucioles; F-06921 Sophia-Antipolis Cedex; France, V12.14.0, Mar. 1, 2015 (Mar. 1, 2015), XP050927969,pp. 1-131.

(Continued)

*Primary Examiner* — Shawnchoy Rahman
(74) *Attorney, Agent, or Firm* — Loza & Loza, LLP

(57) ABSTRACT

A method is provided for facilitating service-specific security while avoiding a full authentication and key agreement exchange each time a service is activated on a device. Multiple services on a single device and sharing the same session link (e.g., radio link or radio bearer) and the same physical network may nonetheless obtain distinct service-specific network connectivity root keys from which service-specific security/session keys may be derived. In such case, instead of performing a full authentication and key agreement exchange with an operator or provider (e.g., home subscription server or HSS), the device may authenticate a network slice using a security credential established during a prior authentication with another network slice.

63 Claims, 12 Drawing Sheets

(56) References Cited

U.S. PATENT DOCUMENTS

| | | | |
|---|---|---|---|
| 9,775,028 B2* | 9/2017 | Zhang | H04W 12/04 |
| 2007/0220598 A1 | 9/2007 | Salowey et al. | |
| 2011/0078455 A1* | 3/2011 | Zhu | G06Q 20/341 |
| | | | 713/182 |
| 2011/0261961 A1 | 10/2011 | Dharmaraju et al. | |
| 2012/0027211 A1 | 2/2012 | Lehtovirta et al. | |
| 2012/0102315 A1 | 4/2012 | Holtmanns et al. | |
| 2012/0265983 A1* | 10/2012 | Yegin | G06F 21/57 |
| | | | 713/155 |
| 2015/0163669 A1 | 6/2015 | Holtmanns et al. | |

OTHER PUBLICATIONS

International Search Report and Written Opinion—PCT/US2016/052286—ISA/EPO—Dec. 15, 2016.

* cited by examiner

KEY HIERARCHY FOR NETWORK SLICING

RELATED APPLICATIONS

This application claims priority to U.S. Provisional Application No. 62/242,961, filed Oct. 16, 2015, titled "Key Hierarchy for Network Slicing" the contents of which are incorporated by reference herein.

FIELD

The present application relates to authentication and key agreement a mobile devices, and more specifically, to a key hierarchy and method that enables creating multiple logical networks on a single physical network.

BACKGROUND

In some communication systems and/or networks, a mobile device may use a wireless network to facilitate communications to/from the mobile device. Prior to communicating over a network, a mobile device typically, authentication and key agreement typically takes place to determine whether the mobile device is authorized to operate over a particular physical network and generate a security context, including one or more keys to secure communications between the mobile device and network entities. Typically, for a particular mobile device, security context obtained for a physical network is used to secure multiple services for the mobile device.

However, some services operating over the physical network may require network isolation due to different service requirements. Different services may need different key management and mobility/session management procedures, e.g., may require a separate Mobility Management Entities (MMEs). But performing separate authentication and key agreements for each service in the same network may incur unnecessary signaling and management overhead. For instance, this may be the case where a single device has enabled multiple services over the same or different radio links or bearers. The separate security contexts for different services may necessitate separate or fill authentication and key agreement procedures for each service.

Consequently, a solution is needed that provides individualized recur each service operating over a network while minimizing overhead.

SUMMARY

A first aspect provides a method operational at a device. An authentication and key agreement (AKA) exchange is performed with a first network entity operating on a network. A device-specific network connectivity root key is generated/obtained from the AKA exchange. A service registration procedure is performed for a first service through the network. A first service-specific network connectivity root key is obtained from the service registration procedure, wherein the first service-specific network connectivity root key is, at least partially, a function of the device-specific network connectivity root key and a first service identifier, and each distinct service activated by the device has a distinct service-specific network connectivity root key. Traffic for the first service may be secured based on the first service-specific network connectivity root key. In one example, only traffic in a control plane is secured based on the first service-specific network connectivity root key. In another example, the traffic may include the first service identifier. The service registration procedure may be performed concurrently with the AKA exchange by including the first service identifier as part of an AKA request. The service registration procedure may be performed in a separate operation than the AKA exchange.

Obtaining the first service-specific network connectivity root key may include generating a local instance of the first service-specific network connectivity root key at the device. In one example, the method may further comprise sending a first attachment request including the first service identifier to initiate the AKA exchange. A first key set identifier may be received that serves to identify the device-specific network connectivity root key. A second key set identifier may be received that serves to identify the first service-specific network connectivity root key. A second attachment request may be sent including second service identifier and the first key set identifier to initiate a service registration procedure for a second service through the network, the second service associated with the second service identifier. In response to the second attachment request, a second service-specific network connectivity root key may be obtained that is, at least partially, a function of the device-specific network connectivity root key and a second service identifier. A second key set identifier may be received that serves to identify the second service-specific network connectivity root key.

Additionally, another service registration procedure may be performed for a second service. A second service-specific network connectivity root key may be obtained/received from the another service registration procedure, wherein the second service-specific network connectivity root key is, at least partially, a function of the device-specific network connectivity root key and a second service identifier.

The method may further include: (a) deriving a set of keys from the first service-specific network connectivity root key; (b) securing traffic at a access stratum of the network using a first key from the set of keys; and/or (c) securing traffic at a non-access stratum of the network using a second key from the set of keys.

In one example, obtaining the device-specific network connectivity root key may include generating the device-specific network connectivity root key based on a secret root key and a key derivation algorithm identified during the AKA exchange.

In one example, the service registration procedure is performed with a second network entity. In another example, the service registration procedure avoids performing a full AKA exchange.

A wireless communication link or session may be established with the network, wherein a plurality of services operate over the wireless communication link or session but have distinct security keys.

A second aspect provides a device comprising: a wireless communication circuit an processing circuit. The wireless communication circuit may serve to communicate over a network. The processing circuit may be configured to: (a) perform an authentication and key agreement (AKA) exchange with a first network entity via the wireless communication circuit; (b) generating a device-specific network connectivity root key from the AKA exchange; (c) perform a service registration procedure for a first service through the network; and/or (d) obtain a first service-specific network connectivity root key from the service registration procedure, wherein the first service-specific network connectivity root key is, at least partially, a function of the device-specific network connectivity root key and a first service identifier, and each distinct service activated by the device has a distinct service-specific network connectivity root key.

In some implementations, the service registration procedure may be performed concurrently with the AKA exchange by including a service identifier as part of an AKA request. In other implementations, the service registration procedure may be performed in a separate operation than the AKA exchange.

The processing circuit may be further configured to secure traffic for the first service based on the first service-specific network connectivity root key. In one example, only traffic in a control plane is secured based on the first service-specific network connectivity root key. In another example, the traffic includes the first service identifier.

The processing circuit may be further configured to receive a first key set identifier that serves to identify the device-specific network connectivity root key.

Additionally, the processing circuit may be further configured to receive a second key set identifier that serves to identify the first service-specific network connectivity root key.

The processing circuit may be further configured to: (a) derive a set of keys from the first service-specific network connectivity root key; (b) secure traffic at an access stratum of the network using a first key from the set of keys; and/or (c) secure traffic at a non-access stratum of the network using a second key from the set of keys.

The device-specific network connectivity root key may be obtained by generating the device-specific network connectivity root key based on a secret root key and a key derivation algorithm identified during the AKA exchange.

In one example, the service registration procedure may be performed with a second network entity.

The processing circuit may be further configured to send a first attachment request including the first service identifier to initiate the AKA exchange. The attachment request may further include a first key set identifier that serves to identify the device-specific network connectivity root key. The attachment request may also include a second key set identifier that serves to identify the first service-specific network connectivity root key.

The processing circuit is further configured to: (a) send a second attachment request including second service identifier and the first key set identifier to initiate a service registration procedure for a second service through the network, the second service associated with the second service identifier; (b) obtain a second service-specific network connectivity root key that is, at least partially, a function of the device-specific network connectivity root key and a second service identifier; and/or (c) receive a second key set identifier that serves to identify the second service-specific network connectivity root key.

The processing circuit may also be configured to: (a) perform a second service registration procedure for a second service; and/or (b) obtain a second service-specific network connectivity root key from the second service registration procedure, wherein the second service-specific network connectivity root key is, at least partially, a function of the device-specific network connectivity root key and a second service identifier. The second service registration procedure avoids performing a full AKA exchange.

A third aspect provides a method operational at a network device. An authentication request may be received from a first device, where the authentication request includes a home network identifier, a device identifier, and a service identifier. A device-specific network connectivity root key may be obtained from a home subscriber server using the device identifier. The device-specific network connectivity root key is provided to a second network device for subsequent generation of service-specific network connectivity root keys, based on the device-specific network connectivity root key.

An authentication and key agreement (AKA) exchange may be performed with the device based on the device-specific network connectivity root key. A service-specific network connectivity root key may be obtained based on the device-specific network connectivity root key and the service identifier. The service-specific network connectivity root key may be provided to a mobility management entity device.

The authentication request may further include a first key set identifier that serves to identify the device-specific network connectivity root key.

The method may further include: (a) obtaining a first key set identifier that serves to identify the device-specific network connectivity root key; and/or (b) obtaining a second key set identifier that serves to identify a service-specific network connectivity root key based on the device-specific network connectivity root key and the service identifier.

A fourth aspect provides a network device comprising a network communication circuit and a processing circuit. The network communication circuit may serve to communicate over a network to one or more devices. The processing circuit may be configured to: (a) perform an authentication and key agreement (AKA) exchange with a first device; (b) obtain a device-specific network connectivity root key from the AKA exchange; and/or (c) provide the device-specific network connectivity root key to a second network device for subsequent generation of service-specific network connectivity root keys, based on the device-specific network connectivity root key.

A fifth aspect provides a method operational at a network device. A service registration request may be received from a first device for a first service. A device-specific network connectivity root key associated with the first device may be obtained. A first service-specific network connectivity root key may be obtained that is, at least partially, a function of the device-specific network connectivity root key and a first service identifier, and each distinct service activated by the first device has a distinct service-specific network connectivity root key. Traffic for the first service to the first device may be secured based on the first service-specific network connectivity root key. In one example, only traffic in a control plane is secured based on the first service-specific network connectivity root key. In some instances, the traffic may include the first service identifier.

A set of keys may be derived from the first service-specific network connectivity root key, where a first key from the set of keys serves to secure traffic at an access stratum of the network, and a second key from the set of keys serves to secure traffic at a non-access stratum of the network.

The method may further comprise obtaining at least one of: (a) a first key set identifier that serves to identify the device-specific network connectivity root key; or (b) a second key set identifier that serves to identify the first service-specific network connectivity root key.

The method may further comprise sending, to the first device, at least one of: (a) a first key set identifier that serves to identify the device-specific network connectivity root key; or (b) a second key set identifier that serves to identify the first service-specific network connectivity root key.

The method may further comprise: (a) receiving a second service registration request from the first device for a second service; and (b) obtaining a second service-specific network connectivity root key that is, at least partially, a function of the device-specific network connectivity root key and a first service identifier. The second service registration request may include the device-specific network connectivity root key.

A session may be established with the network, wherein a plurality of services operate over the same session but have distinct security keys.

A sixth aspect provides a network device comprising a network communication circuit and a processing circuit. The network communication circuit may serve to communicate over a network to one or more devices. The processing circuit may be configured to: (a) receive a service registration request from a first device for a first service; (b) obtain a device-specific network connectivity root key associated with the first device; and/or (c) obtain a first service-specific network connectivity root key that is, at least partially, a function of the device-specific network connectivity root key and a first service identifier, and each distinct service activated by the first device has a distinct service-specific network connectivity root key.

DETAILED DESCRIPTION

Figure 1:
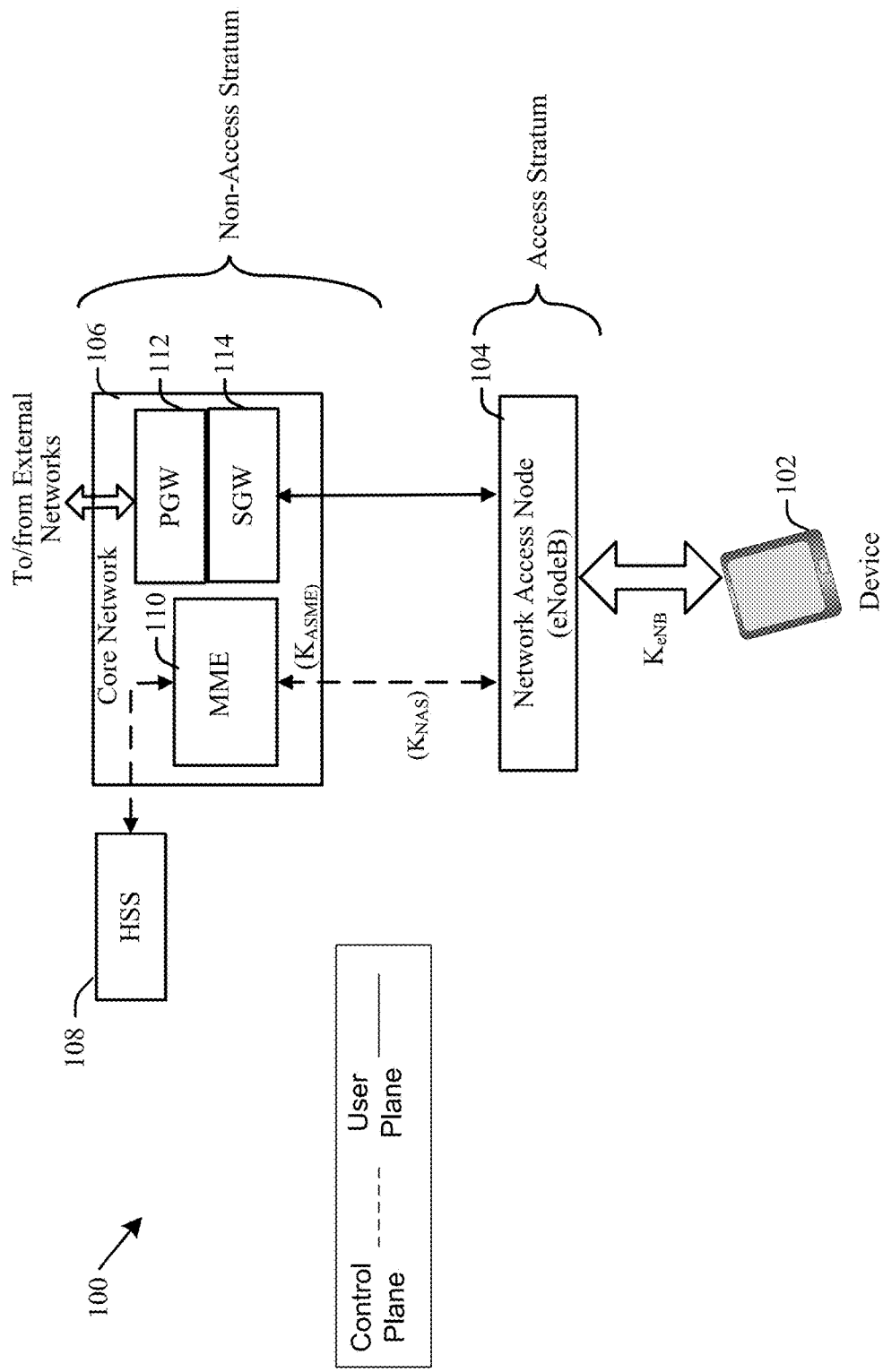
FIG. 1 is a block diagram of an exemplary network environment in which one or more mobile devices may operate.

In the following description, reference is made to the accompanying drawings in which is shown, by way of illustration, specific aspects and features described in the disclosure. The aspects and features described in the disclosure are intended to be provided in sufficient detail to enable those skilled in the art to practice the invention. Other aspects and features may be utilized and changes may be made to that which is disclosed without departing from the scope of the disclosure. The following detailed description is not to be taken in a limiting sense, and the scope of the aspects and features described and illustrated herein is defined only by the appended claims.

The terms "served device", "client device, "mobile device", and/or "user equipment" (UE) may be interchangeably used herein to refer to a wireless device, subscriber device, network access device, mobile phone, mobile communication device, mobile computing device, digital tablet, smart phone, user device, user terminal, or terminal. The term "device" may include and/or refer to a chip component such as a system-on-a-chip (SoC), semiconductor device, integrated device, or modem, among other devices and/or the term "device" may also refer to an end user device, such as a client device, incorporating or including such a chip component. The term "network access node" may be used herein to refer to any device that includes wireless device connectivity between a mobile device and a serving network. Networks external to a core network of a cellular communication system, such as a packet data network (PDN) (e.g., the Internet) and an IP Multimedia Service (IMS) network may be exemplified herein by reference to the PDN, however, nothing is intended to limit networks external to the core network to PDNs or IMS networks. Furthermore, aspects and features presented herein are exemplary. Nothing is intended to limit any aspect or feature presented herein to use in only a cellular communication system.

Overview

A method is provided for facilitating service-specific security while avoiding a full authentication and key agreement exchange each time a service is activated on a served or client) device. Multiple services on a single (served or client) device and sharing the same session link (e.g., radio link or radio bearer) and the same physical network may nonetheless obtain distinct service-specific network connectivity root keys from which service-specific security/session keys may be derived. In such case, instead of performing a full authentication and key agreement exchange with an operator or provider (e.g., home subscription server or HSS), the (served or client) device may authenticate a network slice using a security credential established during a prior authentication with another network slice.

This service-specific security model may be said to create or operate on multiple virtual/logical networks (e.g., one virtual/logical network per distinct service) while still operating on a single physical network. That is, multiple services may be enabled at multiple network slices (e.g., one service per network slice) that are isolated from each other and maybe hosted at single operator, single core network, and/or over a single radio link or bearer. Network slices may be, for example, logically or virtually distinct resources/instances which may operate on the same physical network and/or component.

This service-specific security model avoids the resource expensive task of authentication and key agreement (AKA) exchange by running such AKA exchange just once to obtain a device-specific (or subscriber-specific) network connectivity root key for a specific (served or client) device. As the (served or client) device activates different services, it generates service-specific network connectivity root keys based on a single connectivity root key (e.g., the device-specific network connectivity root key) and the service type/identifier. From the service-specific network connectivity root key, the (served or client) device (and serving network node(s)) are able to generate service-specific security/session keys. Note that each of these keys (e.g., device-specific network connectivity root key, service-specific network connectivity root key, service-specific security/session keys) may be derived by the (served or client) device and network node(s) and are not transmitted over the air.

In one exemplary implementation, a Session Key Management Function (SKMF) may be implemented at a network to generate device-specific network connectivity root keys for the (served or client) device being serviced by the network. Note that the "session" may be an authentication session established by a full AKA. The SKMF retrieves or obtains the authentication information for the (served or client) device from a home subscriber server (HSS) for a network. This authentication information may include an authentication session key (also referred to as a device-specific network connectivity root key or $K_{SKMF}$).

The SKMF then generates a service-specific session key (also referred to as a service-specific network connectivity root key or MME specific session key or $K_{ASME,Sx}$) for the (served or client) device and provides it to a mobility management entity (MME). The (served or client) device authentication information may be stored at the SKMF and be used for authenticating with multiple services.

The SKMF may serve as the security anchor for network connectivity. A single AKA exchange is performed for a network access between a (served or client) device and an SKMF. The (served or client) device may activate multiple services, and when a service registration is requested by the (served or client) device, a new service-specific network connectivity root key for an MME created by the SKMF. For instance, the SKMF may derive a first service-specific network connectivity root key ($K_{ASME,S1}$) based on the device-specific network connectivity root key ($K_{SKMF}$) and, at least partially, the service type/identifier.

The MME may serve as the security anchor for a service. The MME may obtain the service-specific network connectivity root key ($K_{ASME,S1}$) from the SKMF which it can use to derive service-specific security/session keys for a particular service.

Note that, in some implementations, the device-specific network connectivity root keys may be subscriber-specific network connectivity root keys. So, if a (served or client) device has multiple distinct subscriptions (e.g., subscriptions with different network connectivity service providers), it may have distinct subscriber-specific network connectivity root keys (e.g., one for each subscription), rather than a device-specific network connectivity root key.

Exemplary Network Environment and Key Hierarchy

FIG. 1 is a block diagram of an exemplary network environment in which one or more mobile devices may operate. In one, non-limiting, example, an exemplary network 100 may include a core network 106 and one or more network access nodes 104. The core network may include a mobility management entity (MME) 110, a packet data network (PDN) gateway (PGW) 112, a serving gateway (SGW) 114, and a home subscriber server (HSS) 108 that operate together to authenticate and facilitate wireless connectivity and network communication services to one or more (served or client) devices 102 via the one or more network access nodes 104.

Generally, the one or more network access nodes 104 are said to operate at the Access Stratum while the core network 106 is said to operate at the Non-Access Stratum.

The MME 110 may be involved in a bearer activation/ deactivation process for a (served or client) device and is also responsible for choosing the SGW for a (served or client) device at the initial attach and/or during a handover. The MME 110 may also facilitate authentication of the (served or client) device 102 by interacting with the HSS 108. The Non Access Stratum (NAS) signaling terminates at the MME 110 and it is also responsible for generation and allocation of temporary identities to the (served or client) device 102. It checks the authorization of the (served or client) device 102 to camp on the service provider's Public Land Mobile Network (PLMN) and enforces (served or client) device roaming restrictions. The MME 110 is the termination point in the network for ciphering/integrity protection for NAS signaling and handles the security key management. The MME 110 may also provide the control plane functions for mobility between different types of networks.

The SGW 114 may route and forward user data packets, while also acting as the mobility anchor for the user plane during handovers (e.g., from the network access node 104 to another access node) and as the anchor for mobility between different types of networks. For idle state (served or client) devices, the SGW 114 terminates the downlink data path and triggers paging when downlink data arrives for the (served or client) device 102. The SGW 114 may also manage and store (served or client) device contexts, e.g. parameters of an IP bearer service, network internal routing information.

The PDN Gateway (PGW) 112 may provide connectivity from (served or client) device 102 to external packet data networks by being the point of exit and entry of traffic for the (served or client) device 102. The (served or client) device 102 may have simultaneous connectivity with more than one PGW for accessing multiple PDNs. The PGW 112 may perform policy enforcement, packet filtering for each (served or client) device, etc.

The HSS 108 may be a central database that contains user-related and subscription-related information. The functions of the HSS 108 may include functionalities such as mobility management, call and session establishment support, user authentication and access authorization.

Authentication of the (served or client) device 102 refers to a process of determining whether the (served or client) device 102 (or user of the served or client device) is an authorized subscriber to the network it is attempting to access. Among various authentication procedures available in such networks, an evolved packet system (EPS) authentication and key agreement (AKA) procedure may be used in LTE networks for mutual authentication between (served or client) devices and networks. The EPS AKA procedure includes of two steps. First, an HSS 108 generates an EPS authentication vector(s) (e.g., RAND, AUTN, XRES, $K_{ASME}$) and delivers them to the MME 110. Second, the MME 110 selects one of the authentication vectors and uses it for mutual authentication with the served or client) device 102 and shares the same authentication key ($K_{ASME}$) with each other. Mutual authentication is the process in which the network 106 and the (served or client) device 102 authenticate each other. In LTE networks, since a network identifier ID of the (served or client) device's serving network is required when generating authentication vectors, authentication of the network 106 by the (served or client) device 102 is performed in addition to authentication of the (served or client) device 102 by the network 106.

To avoid any possible eavesdropping or manipulation of data across radio links, the authentication key $K_{ASME}$ is not delivered to the (served or client) device 102 via wireless network. Instead, the MME 110 delivers part of the authentication vector to the (served or client) device 102, which uses it to authenticate the network and (generates the authentication key $K_{ASME}$ in the same way that the HSS 108 does.

Figure 2:
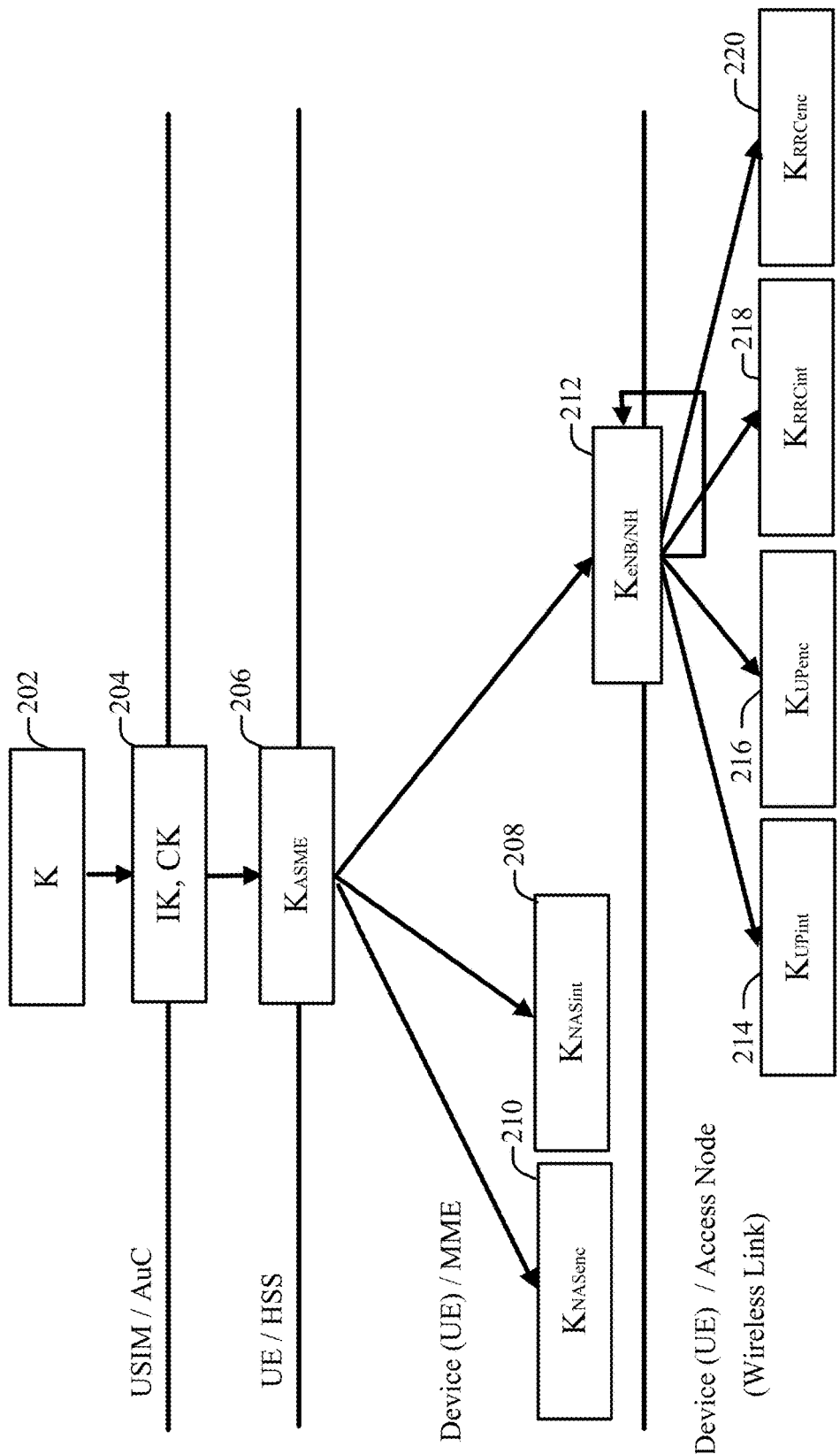
FIG. 2 illustrates an example of a key hierarchy that may be implemented on the network of FIG. 1.

FIG. 2 illustrates an example of a key hierarchy 200 that may be implemented on the network of FIG. 1. In this example, LTE may use separate keys for Access Stratum, Non-Access Stratum, and User-plane) protection.

A secret key K 202 may be pre-provisioned on the (served or client) device and known to a service provider. This secret key K 202 may serve to generate other keys in the key hierarchy 200. In one example, a Universal Subscriber Identity Module (USIM) for the (served or client) device 102 and an Authentication Centre (AuC) for the network 106 may share the long-term secret root key K 202. The secret root key K 202 may also be referred to as a shared secret key, a pre-shared key, etc. The secret key K may be used to generate a cipher key CK and an integrity key IK 204, for example, when the (served or client) device 102 performs an Authentication and Key Agreement (AKA) procedure. The AKA procedure uses a permanent (served or client) device identity, which may be an International Mobile Subscriber Identity (IMSI). The CK and IK keys 204 may be used to derive an Access Security Management Entity (ASME) authentication key $K_{ASME}$ 206, which may be provided to MME 110. The CK and IK keys 204 are kept in MME 110 and are not transmitted to other network elements or the (served or client) device 102.

The Access Security Management Entity (ASME) is an entity that receives top-level key(s), from the HSS 108, to be used in the access network. In EPS, the MME 110 may serve as the ASME and the authentication key $K_{ASME}$ 206 is used as the top-level key in the access network. The MME 110, on behalf of the HSS 108, may conduct mutual authentication with the (served or client) device 102 using the authentication key $K_{ASME}$ 206. Once mutually authenticated, the (served or client) device 102 and the MME 110 get to share the same authentication $K_{ASME}$ 206.

Once the (served or client) device 102 and MME 110 have completed the AKA procedure (i.e., authenticated each other) and the same authentication key $K_{ASME}$ is shared, the MME 110 and the (served or client) device 102 may perform a NAS Security Mode Control Procedure to configure security for the Network Access Stratum (NAS). The authentication key $K_{ASME}$ may be used to generate session keys, including an integrity protection key $K_{NASint}$ 208 and a ciphering key $K_{NASenc}$ 210. In one example, the MME 110 may select one or more NAS security algorithms (Alg-ID: Algorithm ID) and uses them to create an integrity key ($K_{NASint}$) and a ciphering key ($K_{NASenc}$) from $K_{ASME}$. The MME 110 then delivers the selected NAS security algorithms and the NAS authentication code to the (served or client) device 102. The (served or client) device 102 receives the selected NAS security algorithms (Alg-ID: Algorithm ID) and uses them to generate the integrity key $K_{NASint}$ 208 and the ciphering key $K_{NASenc}$ from $K_{ASME}$.

The $K_{NASint}$ key may be used for integrity protection and the $K_{NASenc}$ key may be used for ciphering of NAS signaling messages, such as registration messages, exchanged between the (served or client) device 102 and the MIME 110. The $K_{ASME}$ key may also be used to generate an access node (or eNB) key $K_{eNB}$ 212, which may be passed to a serving access node 104 for the (served or client) device 102. Additional access node (eNB) keys, such as $K_{UPint}$ 214, $K_{UPenc}$ 216, $K_{RRCint}$ 218, and/or $K_{RRCenc}$ 220 keys may be generated by the (served or client) device 102 and the serving access node (eNB) 104 from the $K_{eNB}$ key 212 and may be used for secure communication between the (served or client) device 102 and the network access node (eNB) 104.

Under the key hierarchy 200 in FIG. 2, all traffic for a session between the (served or client) device 102 and MME 110 is protected by the same set of security keys, i.e., from $K_{ASME}$ and all keys derived some services operating over the physical network may require network isolation due to different service requirements.

However, different services may need different key management and mobility/session management procedures, e.g., may require separate MMEs. But performing separate authentication and key agreements for each service in the same network may incur unnecessary signaling and management overhead.

Exemplary Network Slicing with New Session Key Management Function (SKMF)

A novel approach is provided herein in which individualized security may be setup for each service operating over a network while minimizing overhead. To accomplish this, a plurality of virtual/logical core networks may be implemented on a single physical core network, each virtual/logical core network having separate and distinct security keys. For instance, each virtual/logical core networks may serve to establish a distinct security context/keys for a different service with a (served or client) device.

Figure 3:
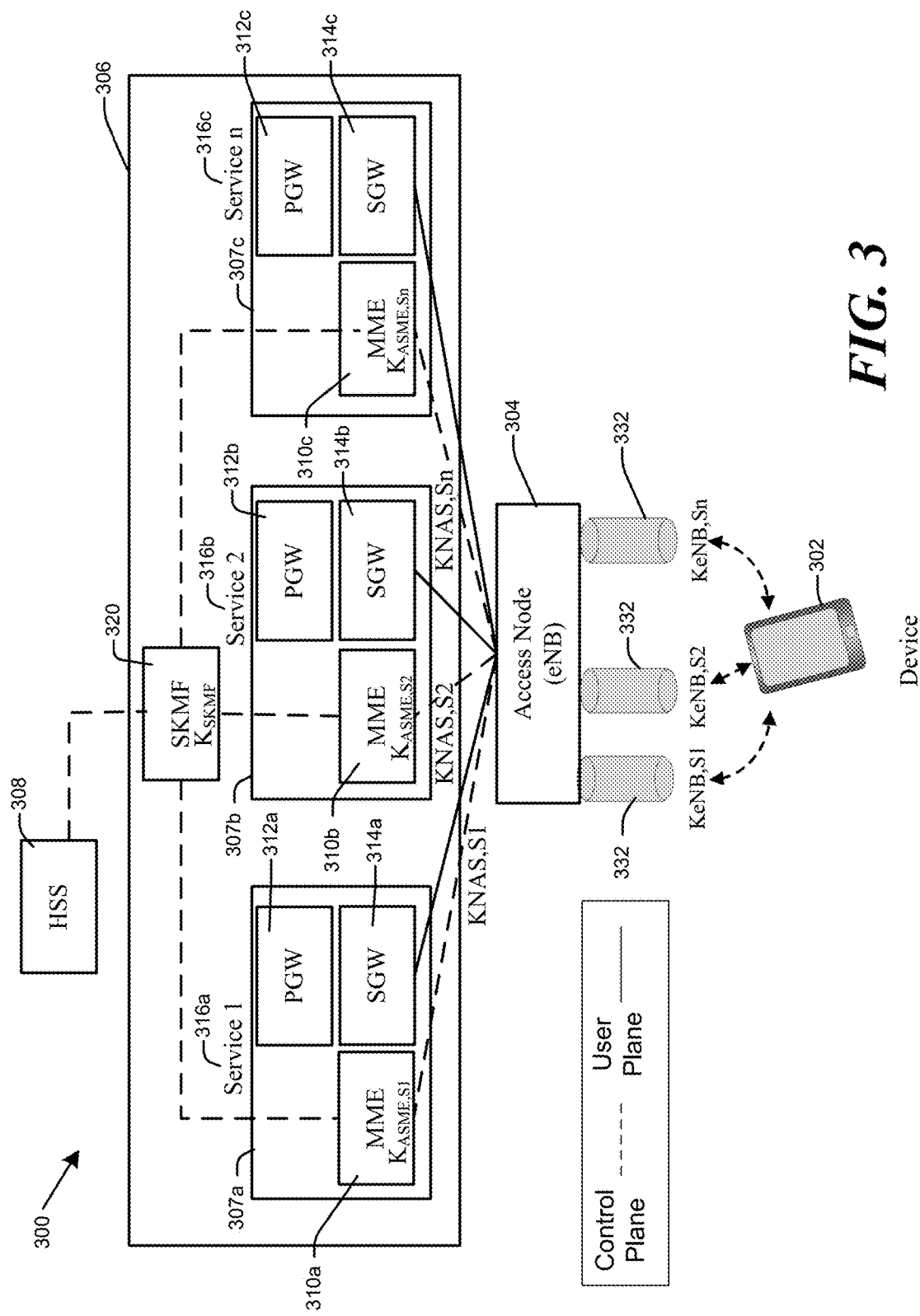
FIG. 3 illustrates an exemplary network environment in which a Session Key Management Function (SKMF) is implemented between an MME and a HSS to implement network slicing.

FIG. 3 illustrates an exemplary network environment in which a Session Key Management Function (SKMF) is implemented between an MME and a HSS to implement network slicing. Network slicing permits providing distinct security contexts or keys for different services on a (served or client) device by implementing a plurality of virtual/logical core networks 307 on the same physical core network 306.

Similar to FIG. 1, an exemplary network 300 may include the core network 306 and one or more network access nodes 304. The core network 306 may include a mobility management entity (MME) 310, a packet data network (PDN) gateway (PGW) 312, a serving gateway (SGW) 314, and is communicatively coupled to a home subscriber server (HSS) 308 that operate together to authenticate and facilitate wireless connectivity and network communication services to one or more (served or client) devices 302 via the one or more network access nodes 304. In one exemplary implementation, a Session Key Management Function (SKMF) 320 is implemented between the MMEs 310 and a HSS 308. Note that a single physical core network 306 (e.g., MME, PGW, and SGW) may serve to implement a plurality of virtual/logical networks 307.

The SKMF 320 becomes the security anchor for network connectivity for the (served or client) device 302. The MME becomes the security anchor for a service. Consequently, security for the different and distinct services enabled over the network 300 is anchored at the SKMF 320.

A single AKA procedure is initially performed for network access between the (served or client) device 302 and the SKMF 320. If the AKA procedure is successful, a device-specific network connectivity root key or subscription-specific network connectivity root key $K_{SKMF}$ is obtained, generated, and/or identified by both the SKMF 320 and the (served or client) device 302.

This device-specific network connectivity root key or subscription-specific network connectivity root key $K_{SKMF}$ may then serve to obtain, generate, and/or identify a distinct service-specific network connectivity key $K_{ASME,X}$ (e.g., service-specific authentication key) for each service (or plurality of services) launched or initiated by the (served or client) device 302.

In one example, if the AKA procedure is successful, the (served or client) device 302 may activate one or more distinct services. When a service registration is requested by the (served or client) device 302, a new service-specific network connectivity key $K_{ASME,Sx}$ is created for the MME 310b by the SKMF 320. Note that, in this example, the MMEs 310a, 310b, and 310c may simply illustrate part of distinct network slices that may operate on the same physical MME. For instance, the MMEs 310a, 310b, and 310c may be part of distinct virtual or logical networks, such that each service activated by the (served or client) device 302 operates on distinct logical/virtual network connections and/or distinct security contexts. However, because the SKMF 320 has already obtained a device/subscription-specific network connectivity root key $K_{SKMF}$ as part of an initial AKA procedure, such AKA procedure is avoided in subsequent activation of services by the (served or client) device 302.

In one example, the (served or client) device 302 may perform the AKA process through the SKMF 320 with an indication of a service registration request, i.e., a service type or service identifier is indicated. The HSS 308 sends one or more authentication vectors AVs to the SKMF 320, where each AV={XRES, AUTN, RAND, $K_{SKMF}$}. Mutual authentication may then be performed between the (served or client) device 302 and the SKMF 320.

For a first service (Service 1) 316a, service key provisioning may then take place in which a first service-specific network connectivity root key $K_{ASME,S1}$ is derived from the device-specific network connectivity root key $K_{SKMF}$ incorporating the service type S1. For instance, the first service-specific network connectivity root key may be generated as $$K_{ASME,S1}=F(K_{SKMF},\text{GUMMEI/Service ID1,Counter or Random number}),$$

where F is the key derivation function, e.g., HMAC-256, GUMMEI is a Globally Unique Mobility Management Entity Identifier, Service IDx may be a service, e.g., service type S1, and a counter/random number. The GUMMEI may include, for example, a Public Land Mobile Network (PLMN) identity, a Mobility Management Entity (MME) group identity and/or an MME code. The counter or random number may serve to keep the keys fresh/updated to avoid replay attacks. The MME code is used in the access node (e.g., eNodeB) by the Non-Access Stratum (NAS) node selection function to select the MME.

The SKMF 320 sends the first service-specific network connectivity root key $K_{ASME,S1}$, associated with the first service S1 of the (served or client) device 302, to a first virtual/logical MME 310a. In one example, when SKMF 320 receives multiple authentication vectors (AVs) from the HSS 308, It may derive multiple $K_{ASME}$ keys and provide them to the respective MMEs 310a, 310b, 310c. Note that the (served or client) device 302 is able to compute the first service-specific network connectivity root key $K_{ASME,S1}$ as before upon receipt of the selected NAS security algorithms and the NAS authentication code.

The mobility procedure may be performed per service (i.e., same as that of LTE). The remaining security keys (e.g., KNASenc, KNASint, KeNB/NH, etc.) are generated in the same manner as before (e.g., as in LTE), but using the first service root key $K_{ASME,S1}$.

Similarly, for a second service (Service 2) 316b, service key provisioning may take place in which a second service-specific network connectivity root key $K_{ASME,S2}$ is derived from (or based on) the device-specific/subscription-specific network connectivity root key $K_{SKMF}$ and the service type S2. For instance, the second service-specific network connectivity root key may be generated as $$K_{ASME,S2}=F(K_{SKMF},\text{GUMMEI/Service ID2,Counter or Random number}).$$

The SKMF 320 sends the second service-specific network connectivity root key $K_{ASME,S2}$, associated with the second service S2 for the (served or client) device 302, to a second virtual/logical MME 310b. Note that the (served or client) device 302 is able to compute the second service-specific network connectivity root key $K_{ASME,S2}$ as before (e.g., on its own) upon receipt of the selected NAS security algorithms and the NAS authentication code.

Likewise, for another service (Service n) 316c, service key provisioning may take place in which an $n^{th}$ service-specific network connectivity root key $K_{ASME,Sn}$ is derived from (or based on) the device-specific (or subscription-specific) network connectivity root key $K_{SKMF}$ incorporating the service type Sn. For instance, the $n^{th}$ service-specific network connectivity root key may be generated as $$K_{ASME,Sn}=F(K_{SKMF},\text{GUMMEI/Service IDn,Counter or Random number}).$$

The SKMF 320 sends the $n^{th}$ service-specific network connectivity root key $K_{ASME,Sn}$, associated with the $n^{th}$ service of the (served or client) device 302, to an $n^{th}$ virtual/logical MME 310c. Note that the (served or client) device 302 is able to compute the $n^{th}$ service-specific network connectivity root key $K_{ASME,Sn}$ as before upon receipt of the selected NAS security algorithms and the NAS authentication code.

Note that, in one implementation, the virtual logical MMEs 310 may actually be implemented on the same physical MME. In other implementations, the MMEs 310a, 310b, and 310c may be implemented in separate and/or distinct physical MMEs.

In this manner each service (or class/group/subset of services) obtains a set of distinct security keys without the (served or client) device 302 having to perform a full AKA involving the HSS each time. That is, because the SKMF 320 has already obtained a device/subscription-specific network connectivity root key $K_{SKMF}$ as part of an initial AKA procedure (e.g., prior to or concurrent with requesting a service S1), such full AKA procedure is avoided in subsequent activation of services by the (served or client) device 302. Additionally, this permits each service activated by the (served or client) device 302 to operate on distinct logical/virtual network connections and/or distinct security contexts. Such distinct security contexts may permit each service to have a customized or service-specific set of security and/or transport rules.

Note that the security service-specific network connectivity root keys obtained from the process described herein are distinct from any security keys that may be obtained for application security or an application-level of a communication protocol stack. Additionally, each service-specific network connectivity root key $K_{ASME,Sx}$ may serve a single service Sx and/or a class/group/plurality of services Sa, Sb, Sc.

Figure 4:
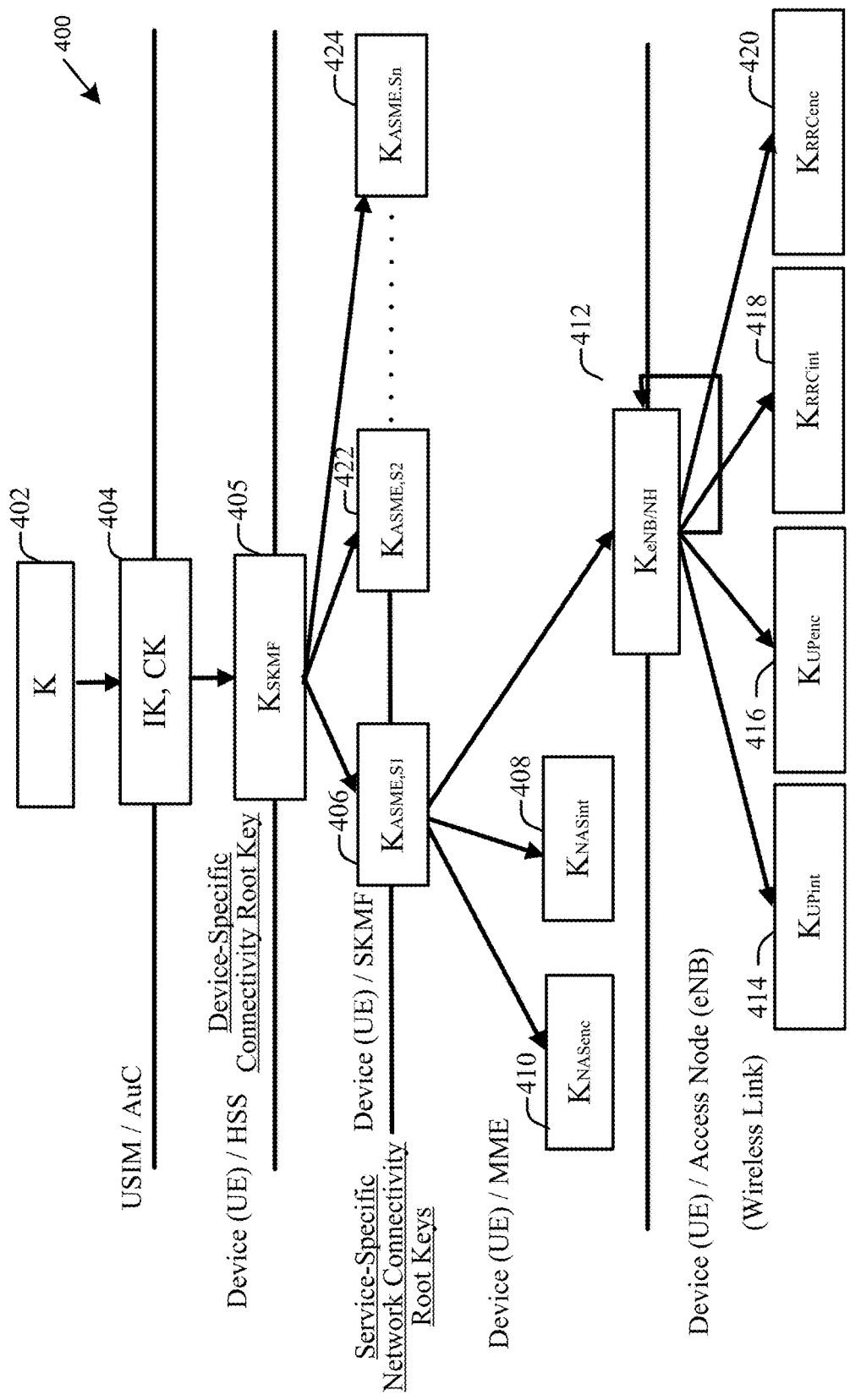
FIG. 4 illustrates an exemplary key hierarchy that may implemented on the network of FIG. 3.

FIG. 4 illustrates an exemplary key hierarchy 400 that may be implemented on the network of FIG. 3. This key hierarchy 400 is similar to the key hierarch 200 of FIG. 2, but each service now has its own set of security keys based on a new service root key $K_{ASME,Sx}$.

A secret key K 402 may be pre-provisioned on the (served or client) device and known to a service provider. This secret key K 402 may serve to generate other keys in the key hierarchy 400. In one example, a Universal Subscriber Identity Module (USIM) for the (served or client) device 302 and an Authentication Centre (AuC) for the network 306 may share the long-term secret root key K 402. The secret root key K 402 may also be referred to as a shared secret key, a pre-shared key, etc. The secret key K may be used to generate a cipher key CK and an integrity key IK 404, for example, when the (served or client) device 302 performs an Authentication and Key Agreement (AKA) procedure. The AKA procedure uses a permanent (served or client) device identity, which may be an International Mobile Subscriber identity (IMSI). The CK and IK keys 404 may be used to derive a new service key $K_{SKMF}$ 405. By provisioning the (served or client) device 302 with the same secret root key K and informing it of the key-generating algorithm being used, both the MME 310 and (served or client) device 302 may separately obtain the same new service key $K_{ASME}$. Note that the $K_{ASME}$ key is derived by SKMF 320 and provisioned to the MME during the AKA procedure. The MME obtains the $K_{ASME}$ key while (served or client) device derives the $K_{ASME}$ key.

Subsequently, as the (served or client) device 302 seeks to activate additional services Sx, a service-specific network connectivity root key $K_{ASME,Sx}$ is generated using the device-specific/subscription-specific network connectivity key $K_{SKMF}$. Note that since the device/subscription-specific network connectivity key $K_{SKMF}$ was previously generated, there is no need to do the AKA procedure again. Upon receipt of such service registration request, the MME 310 may generate the service-specific network connectivity root key $K_{ASME,Sx}$ based on, or as a function of the service key $K_{SKMF}$ and the service type or identifier.

Similar to the key-generation performed in FIG. 2, the MME 310 and the (served or client) device 302 may then perform a NAS Security Mode Control Procedure to configure security for the Network Access Stratum (NAS) using the service-specific network connectivity root key $K_{ASME,Sx}$. The service-specific network connectivity root key $K_{ASME,Sx}$ may be used to generate session keys, including an integrity protection key $K_{NASint}$ 408 and a ciphering key $K_{NASenc}$ 410. In one example, the MME 110 may select one or more NAS security algorithms (Alg-ID: Algorithm ID) and uses them to create a NAS integrity key $K_{NASint}$ and a ciphering key $K_{NASenc}$ from $K_{ASME}$. The MME 310 then delivers the selected NAS security algorithms and the NAS authentication code to the (served or client) device 302. The (served or client) device 302 receives the selected NAS security algorithms (Alg-ID: Algorithm ID) and uses them to generate the integrity key $K_{NASint}$ 408 and the ciphering key $K_{NASenc}$ 410 from the service-specific network connectivity root key $K_{ASME,Sx}$.

The $K_{NASint}$ key may be used for integrity protection and the $K_{NASenc}$ key may be used for ciphering of NAS signaling messages, such as registration messages, exchanged between (served or client) device 302 and MME 410. The $K_{ASME,Sx}$ key may also be used to generate an access node (or eNB) key $K_{eNB}$ 412, which may be passed to a serving access node 304 for the (served or client) device 302. Additional access stratum, such as $K_{UPint}$ 414, $K_{UPenc}$ 416, $K_{RRCint}$ 418, and/or $K_{RRCenc}$ 420 keys may be generated by the (served or client) device 302 and the serving access node (eNB) 304 from the $K_{eNB}$ key 412 and may be used for secure communication between the (served or client) device 302 and the network access node (eNB) 304.

Under the key hierarchy 400 in FIG. 4, there may be a plurality of services operating over the same radio bearer/link and/or authenticated session, but the traffic for each service (served or client) device 302 and MME 310 is protected by a set of service-specific security/session keys. Each set of service-specific security/session keys may be based on a service-specific network connectivity root key $K_{ASME,Sx}$. Consequently, service-specific or per-service non-access stratum (NAS) keys (e.g., integrity key $K_{NASint}$ and a ciphering key $K_{NASenc}$) and access stratum (AS) keys (e.g., key $K_{eNB}$, $K_{UPint}$, $K_{UPenc}$, $K_{RRCint}$, and/or $K_{RRCenc}$) are obtained.

Additionally, service identifiers are carried in the messages or traffic to and/or from the (served or client) device 302 so that the access node (eNB) 304 can determine the service specific key used to secure such message/traffic.

Figure 5A:
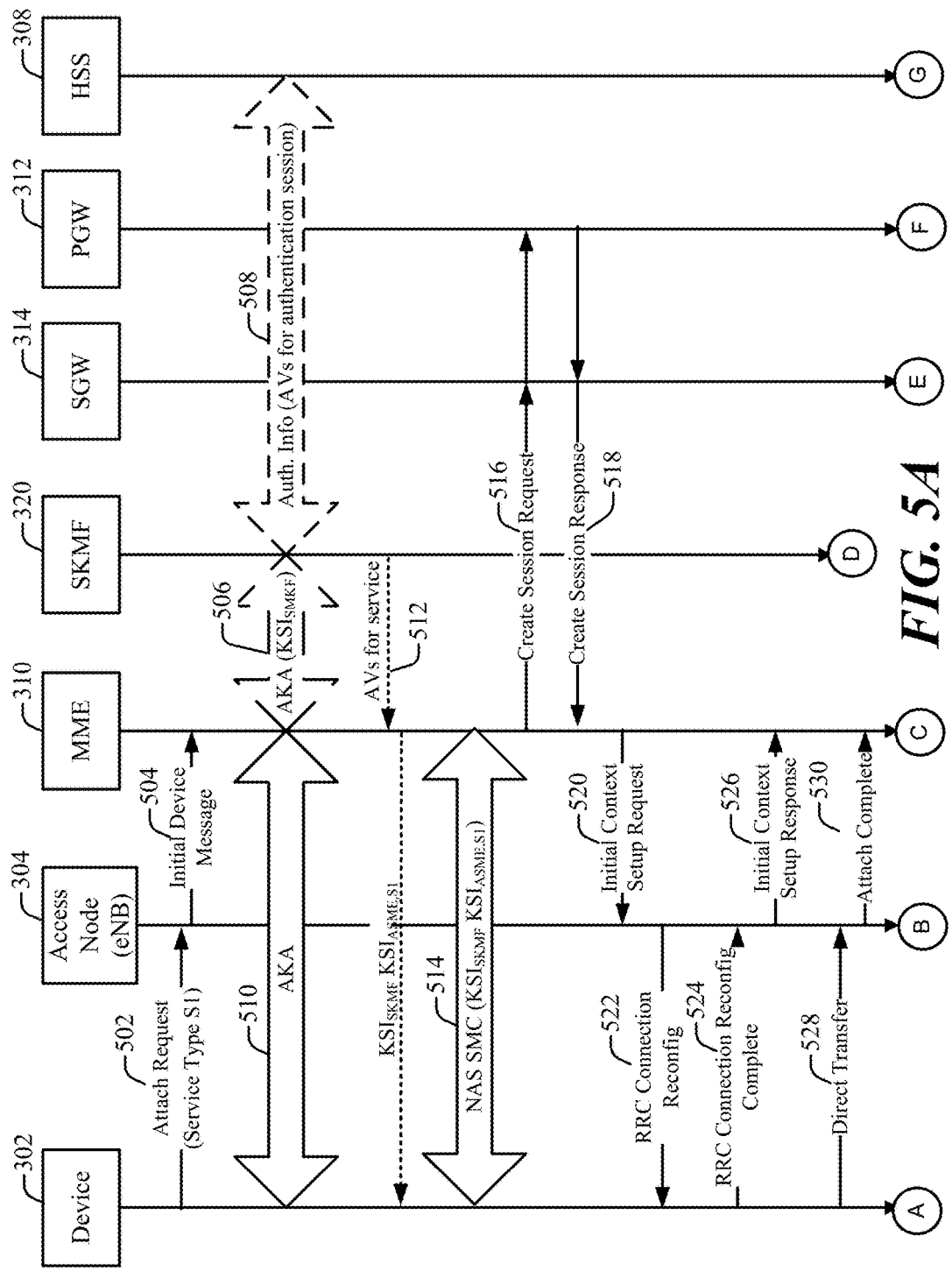
FIG. 5 (comprising FIGS. 5A and 5B) illustrates an exemplary attachment procedure in which a Session Key Management Function (SKMF) may facilitate network slicing to provide per service or service-specific security contexts for different services on a particular device.
Figure 5B:
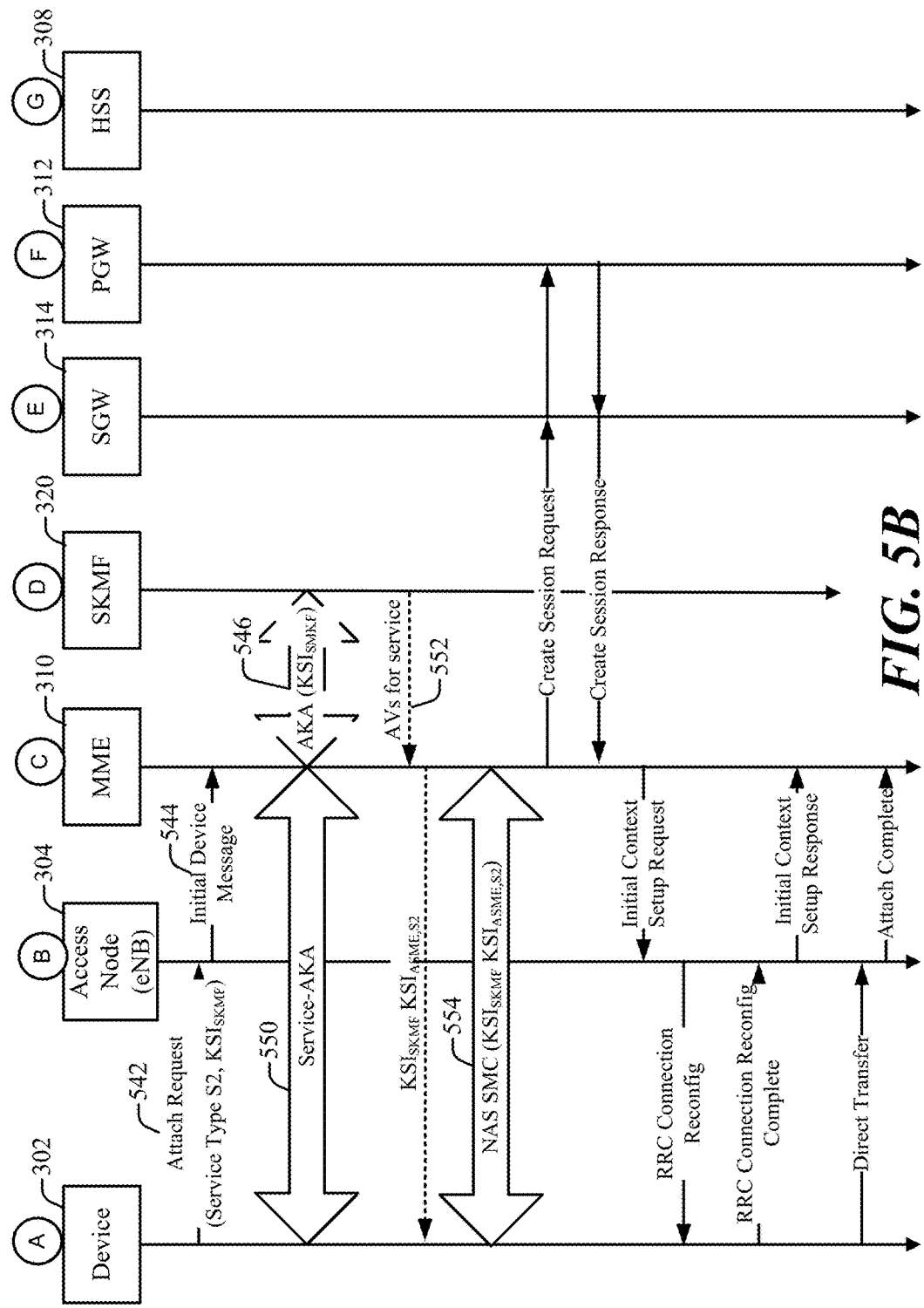

FIG. 5 (comprising FIGS. 5A and 5B) illustrates an exemplary attachment procedure in which a Session Key Management Function (SKMF) may facilitate network slicing to provide per service or service-specific security contexts for different services on a particular (served or client) device. In one example, this attachment procedure may be implemented on some of the devices illustrated in FIG. 3. In the example illustrated in FIG. 5, the (served or client) device 302 may indicate a service type, during an initial attachment, which determines a network slice. Network slicing may provide distinct security contexts or keys for different services on the (served or client) device 302 over the same physical core network 306 and/or over the same radio link or bearer.

The AKA exchange may be started by the (served or client) device 302 sending an attachment request 502 to the access node 304 which, in turn, sends an initial (served or client) device message 504 to the MME 310. In one example, when no previous service activation or attachment request has been sent during a session, the attachment request 502 may include a first service type/identifier S1. For instance, the (served or client) device 302 may include the first service type S1 when activating the service.

The MME 310 may then perform the AKA 506 with the SKMF 320 from which a device-specific/subscription-specific network connectivity key $K_{SKMF}$ (e.g., an authentication session key), which may also be referred to as a connectivity root key, is derived by HSS 308 and sent or provided to the SKMF 320 (as a part of authentication vectors AV 508). This authentication session key $K_{SKMF}$ may be identified by a first key set identifier $KSI_{SKMF}$.

The SKMF 320 may then generate a local instance of the first service-specific network connectivity root key $K_{ASME,S1}$ (e.g., a MME service-specific session key) based, at least partially, on the $K_{SKMF}$ key. The SKMF 320 then sends the first service-specific network connectivity root key $K_{ASME,S1}$, e.g., as part of authentication vectors (AV) 512, to the MME 310 which may use it for NAS security for the related first service S1. Note that a first key set identifier $KSI_{SKMF}$ may be used to identify the authentication session key $K_{SKMF}$ at the SKMF 320 and the second key set identifier $KSI_{ASME,S1}$ may be used to identify the first service-specific network connectivity root key $K_{ASME,S1}$ at the MME 310. In one example, the SKMF 320 may generate or obtain the first key set identifier $KSI_{SKMF}$ and second key set identifier $KSI_{ASME,S1}$ and provides them to the MME 310. Note that, in an alternative implementation, the second key set identifier $KSI_{ASME,S1}$ may be generated by MME 310 instead of the SKMF 320.

In some implementations, the first key set identifier $KSI_{SKMF}$ may be used to distinguish the authentication session key $K_{SKMF}$ when multiple authentication vectors (AV), each of which contains a different authentication session key $K_{SKMF}$, are provided to the SKMF 320 by the HSS 308. Likewise, the second key set identifier $KSI_{ASME,S1}$ may be used to distinguish the service-specific session key generated by the SKMF 320 when multiple service-specific session keys are provided to the MME 310.

As part of the AKA 510 or a separate message, the first key set identifier $KSI_{SKMF}$ and second key set identifier $KSI_{ASME,S1}$ may be provided to the (served or client) device 302 by the MME 310.

In one example, the second key set identifier $KSI_{ASME,S1}$ may be used during a NAS security mode command (SMC) exchange 514 between the (served or client) device 302 and the MME 310.

The MME 310 may then send a create session request 516 to the SGW 314 which then forwards it to the PGW 312. The PGW 312 then provides a create session response 518 to the SGW 314 which forwards it to the MME 310. The MME 310 sends an initial context setup request 520 to the access node 304 which sends a Radio Resource Control (RRC) Connection Reconfiguration message 522 to the (served or client) device 302. In response, the (served or client) device 302 may send an RRC Connection Reconfiguration Complete message 524 to the access node 304 which in turn sends an initial context setup response 526 to the MME 310. Upon the (served or client) device 302 sending a direct transfer 528 to the access node 304, the access node may send an Attach Complete message 530 to the MME 310.

Subsequently (FIG. 5B), when a second service S2 is activated by the served or client) device 302, if an authentication session key $K_{SKMF}$ (e.g., device-specific network connectivity root key) has been previously established for the session, then the (served or client) device 302 may send its identifier as part of second attach request 542 along with a second service type/identifier S2, and optionally, an identifier for a new key set identifier $KSI_{ASME,S2}$ used to identify a second service-specific network connectivity root key. In this example, since the authentication session key $K_{SKMF}$ (e.g., device-specific network connectivity root key, subscription-specific network connectivity root key, or device-specific authentication session root key) has already been generated (in FIG. 5A), then the first key set identifier $K_{SKMF}$ may be used for the second service activation, thereby avoiding the need for a full authentication again.

A second AKA exchange 550 may be started by the (served or client) device 302 sending the second attachment request 542 to the access node 304 which, in turn, sends an initial (served or client) device message 544 to the MME 310. In one example, the attachment request 542 may include a second service type S2 and, optionally, one or two key set identifiers (KSIs). For instance, the (served or client) device 302 may include the second service type S2 when activating the service. In some instances, e.g., when a previous service activation has occurred, the (served or client) device 302 may attach the previously generated/used first key set identifier $KSI_{SKMF}$, which is used to identify authentication session (e.g., serves to identify an authentication key $K_{SKMF}$ being used for that particular session). Such authentication key $K_{SKMF}$ is also interchangeably referred to as a device-specific network connectivity root key, subscription-specific network connectivity root key, and/or a session-specific network connectivity root key.

This second AKA exchange 550 may be referred to as a service-AKA exchange since it does not involve authentication with the HSS 308. Instead, based on the previously generated/used first key set identifier $KSI_{SKMF}$), the SKMF 320 recognizes that a device/subscription authentication has been performed for the same (served or client) device 302 and is still active.

The MME 310 may then perform the AKA 546 with the SKMF 320 using the first key set identifier $KSI_{SKMF}$. Based on the first key set identifier $KSI_{SKMF}$, the SKMF 320 is able to identify the previously obtained authentication key $K_{SKMF}$ for the session of the (served or client) device 302 and uses it, along with second service type/identifier S2, to generate the second service-specific network connectivity root key $K_{ASME,S2}$ (e.g., second service credential or service-specific session key). The SKMF 320 then sends the second service-specific network connectivity root key $K_{ASME,S2}$, e.g., as part of authentication vectors 552, to the MME 310 which may use it for NAS security for the related first service S1. Note that the first key set identifier $KSI_{SKMF}$ may be used to identify the authentication session key (device-specific network connectivity root key) $K_{SKMF}$ at the SKMF 320, the MME device 310, and the (served or client) device 302. Similarly, the second key set identifier $KSI_{ASME,S2}$ may serve to identify the second service-specific network connectivity root key $K_{ASME,S2}$ at the MME device 310 and the (served or client) device 302.

In one example, the second key set identifier $KSI_{ASME,S2}$ may be used during a NAS security mode command (SMC) exchange 554 between the (served or client) device 302 and the MME 310. From this point forward, the second service S2 is setup just as the first service S1 was setup but using the second service-specific network connectivity root key $K_{ASME,S2}$.

In this manner, the (served or client) device 302 may reuse an authentication key that was previously established with the same session. This avoids the need for a full authentication when activating the second service S2.

Exemplary Served/Client Device and Method Operational Thereon

Figure 6:
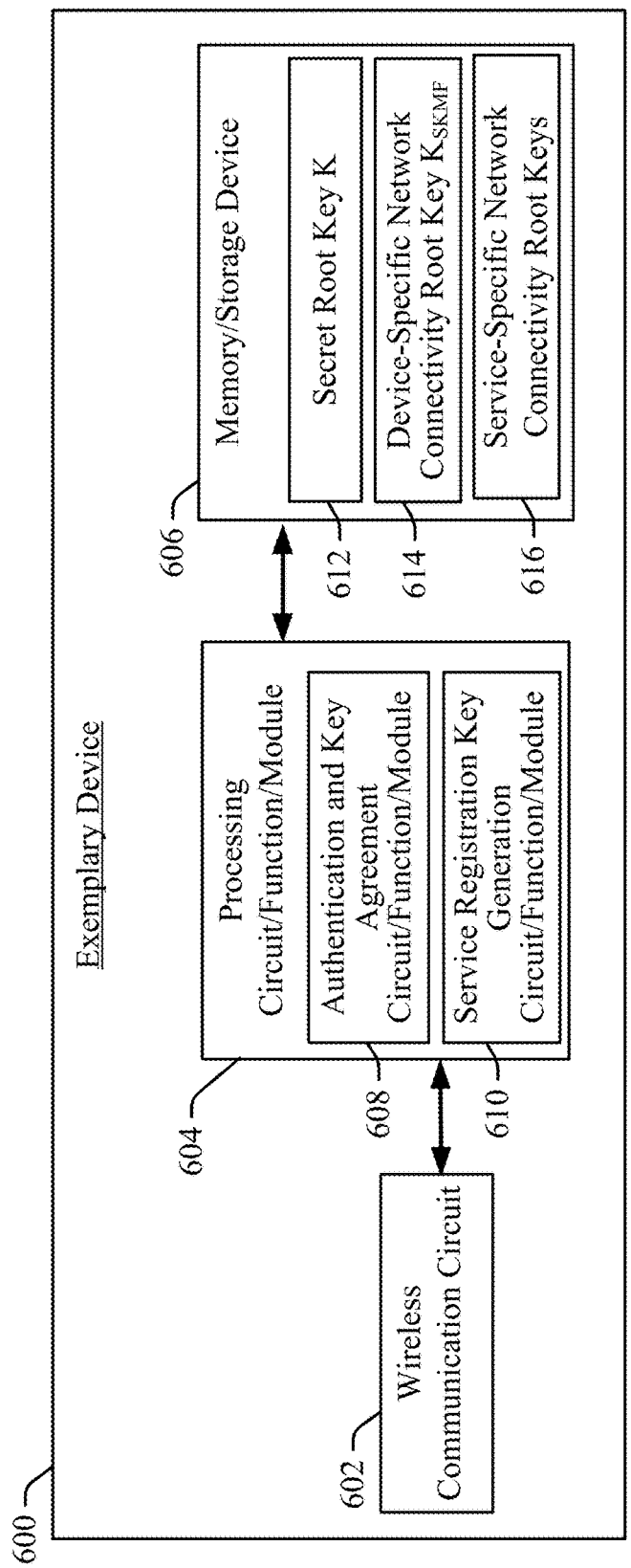
FIG. 6 is a block diagram illustrating an exemplary device configured to perform per-service registration that avoids repeated AKA procedures and obtains distinct security keys for each service over a shared wireless link.

FIG. 6 is a block diagram illustrating an exemplary (served or client) device configured to perform per-service registration that avoids repeated AKA procedures and obtains distinct security keys for each service over a shared wireless link. The (served or client) device 600 may include a processing circuit, function, or module 604 coupled to a wireless communication circuit 602, and a memory/storage device 606. The wireless communication interface circuit 602 may serve to wirelessly couple the (served or client) device 600 to a serving network. The processing circuit 604 may include an authentication and key agreement circuit, function, or module 608 configured to perform an authentication and key agreement (AKA) exchange with a first network entity via the wireless communication circuit 602. For such AKA exchange, and using a secret root key K 612, the (served or client) device 600 may obtain a device-specific (or subscription-specific) network connectivity root key $K_{SKMF}$ 614. Subsequently, a service registration key generation circuit, function, and/or module 610 may serve to perform a service registration procedure with a second network entity for a first service. From this service registration procedure, the (served or client) device 600 may obtain a first service-specific network connectivity root key, wherein the first service-specific network connectivity root key is, at least partially, a function of the device-specific network connectivity root key and a first service identifier, and each distinct service activated by the (served or client) device has a distinct service-specific network connectivity root key 616.

Figure 7:
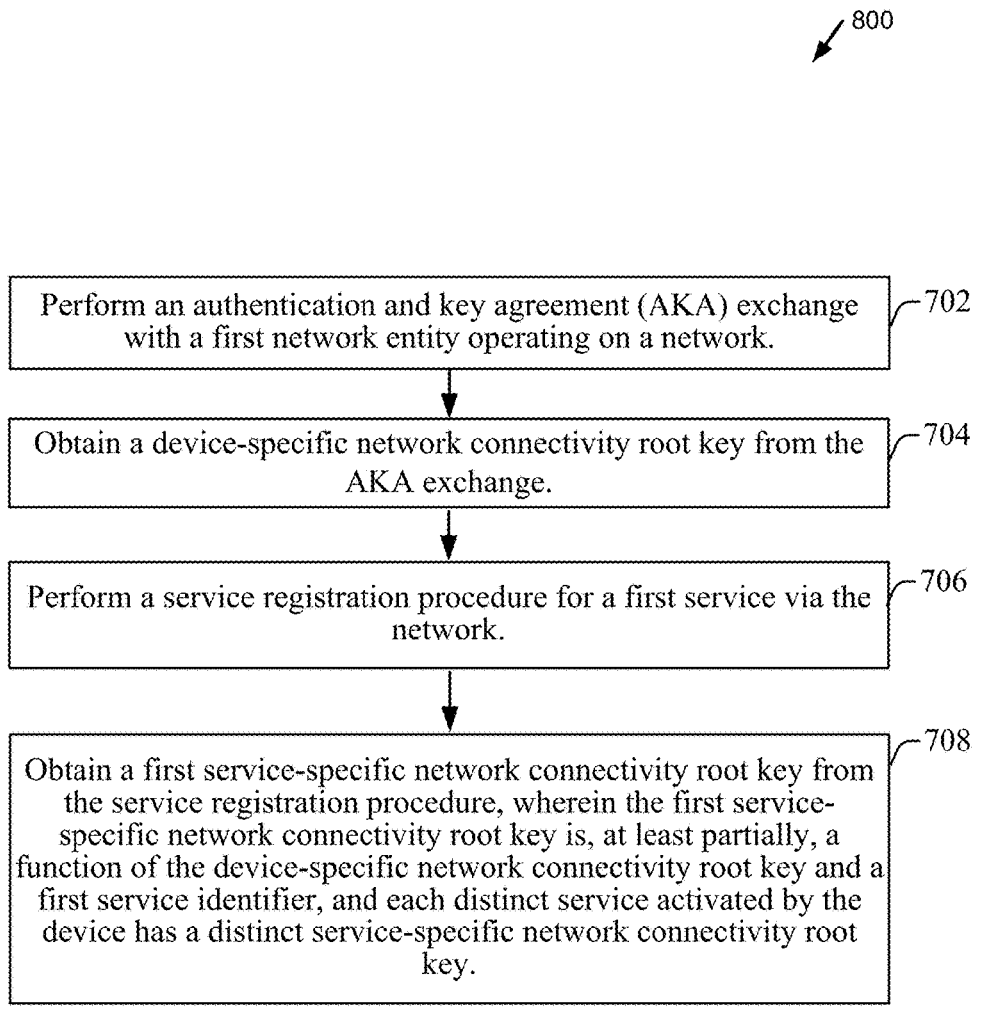
FIG. 7 is a flow diagram illustrating n exemplary method that may be implemented by a device in FIG. 6.

FIG. 7 is a flow diagram illustrating an exemplary method that may be implemented by the (served or client) device in FIG. 6. An authentication and key agreement (AKA) exchange may be performed with a first network entity 702. From the AKA exchange, a connectivity root key may be obtained 704. Subsequently, a service registration procedure may be performed with a second network entity for a first service 706. This service registration procedure avoids performing a full AKA exchange.

A first service-specific network connectivity root key may be obtained from the service registration procedure, wherein the first service-specific network connectivity root key is, at least partially, a function of the device-specific network connectivity root key and a first service identifier, and each distinct service activated by the (served or client) device has a distinct service-specific network connectivity root key 708.

In one exemplary implementation, the service registration procedure may be performed concurrently (e.g., as in FIG. 7) with the AKA exchange by including a service identifier as part of an AKA request. In another exemplary implementation, the service registration procedure may be performed in a separate operation than the AKA exchange.

Traffic for the first service may be secured based on the first service-specific network connectivity root key. In one implementation, only traffic in a control plane is secured based on the first service-specific network connectivity root key (e.g., using keys derived from the first service-specific network connectivity root key). The traffic includes the first service identifier, which allows a recipient to ascertain which key should be used to decode the traffic.

Obtaining the first service-specific network connectivity root key may include generating a local instance of the first service-specific network connectivity root key at the (served or client) device.

The (served or client) device may receive a first key set identifier that serves to identify the device-specific (or subscription-specific) network connectivity root key. Additionally, the (served or client) device may receive a second key set identifier that serves to identify the first service-specific network connectivity root key.

In one implementation, a set of keys may be derived from the first service-specific network connectivity root key. Traffic at an access stratum of the network is secured using a first key from the set of keys. Traffic at a non-access stratum of the network is secured using a second key from the set of keys.

In one example, the device-specific for subscription-specific) network connectivity key may be generated based on a secret root key and a key derivation algorithm identified during the AKA exchange.

Additionally, another service registration procedure may be performed with the second network entity for a second service. A second service-specific network connectivity root key may be obtained from the another service registration procedure, wherein the second service-specific network connectivity root key is, at least partially, a function of the device-specific (subscription-specific) network connectivity root key and a second service identifier.

A wireless communication link may be established with the network, wherein a plurality of services operate over the wireless communication link but have distinct security keys.

Figure 8:
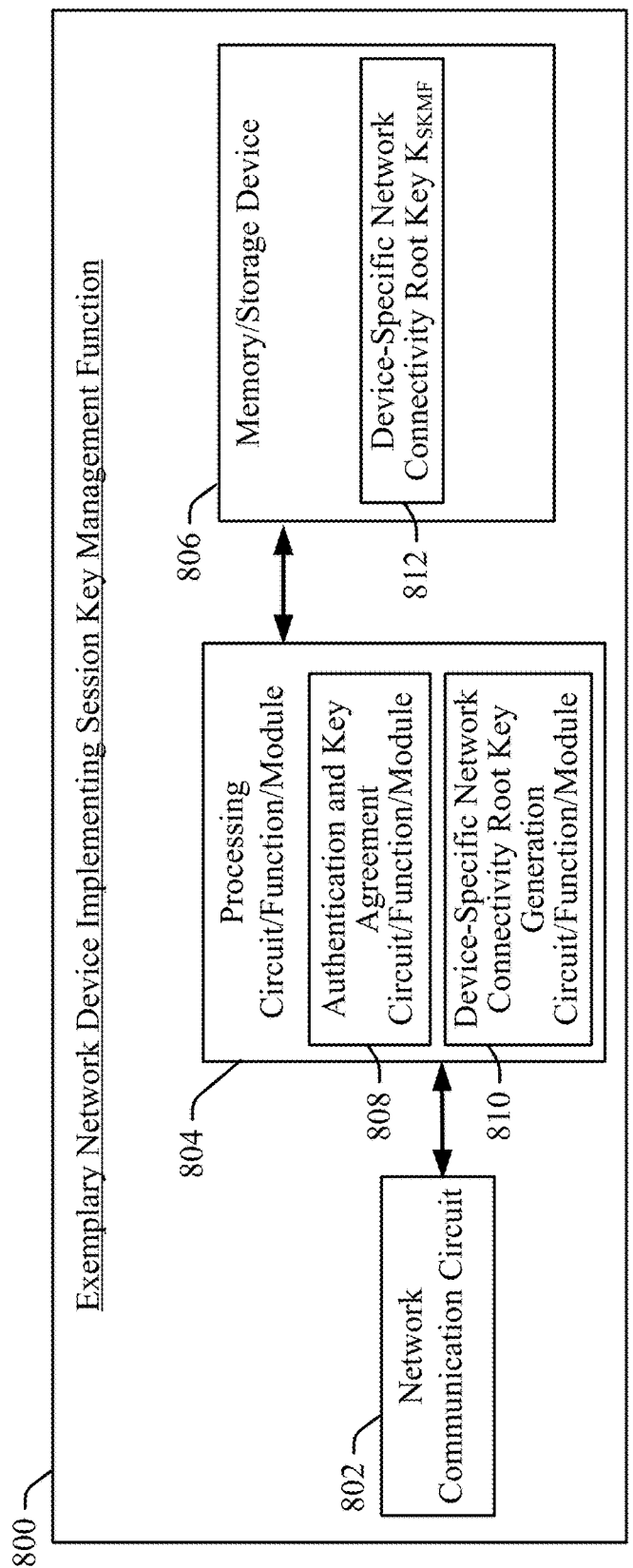
FIG. 8 is a block diagram illustrating an exemplary network device configured to implement a session key management function to generate a device-specific network connectivity root key for devices communicating over a network.

Exemplary Network Device and Method Operational Thereon for Device/Subscription-Specific Network Connectivity Root Key Generation FIG. 8 is a block diagram illustrating an exemplary network device configured to implement a session key management function to generate a device-specific (or subscription-specific) network connectivity root key for (served or client) devices communicating over a network. The network device 800 may include a processing circuit, function, or module 804 coupled to a network communication circuit 802, and a memory/storage device 806. The network communication circuit 802 may serve to communicatively couple the network device 800 to one or more (served or client) devices. The processing circuit 804 may include an authentication and key agreement circuit, function, or module 808 configured to perform an authentication and key agreement (AKA) exchange with a first served or client) device via the network communication circuit 802. A device-specific network connectivity root key generation circuit, function, and/or module 810 may be configured obtain a device-specific network connectivity root key $K_{SKMF}$ 812 as part of the AKA exchange. The device-specific network connectivity root key may then be provided to a second network device for subsequent generation of service-specific network connectivity root keys based on the device-specific network connectivity root key.

Figure 9:
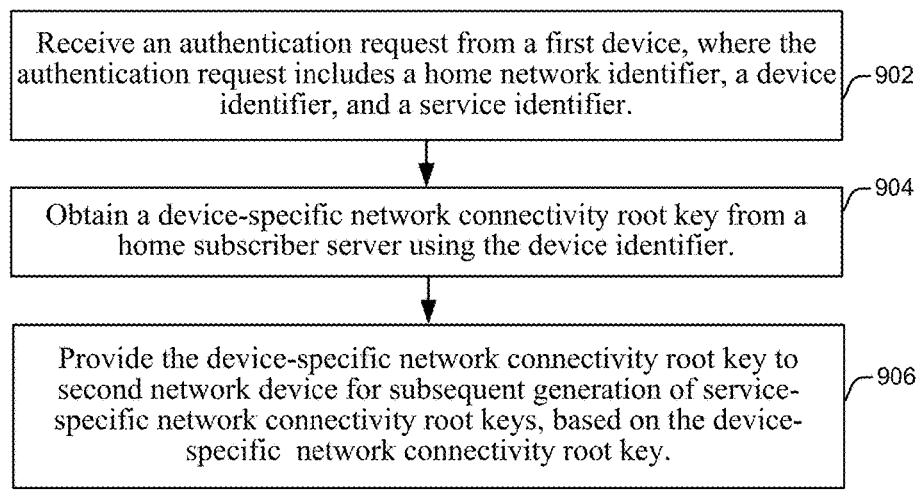
FIG. 9 is a flow diagram illustrating an exemplary method that may be implemented by the network device in FIG. 8.

FIG. 9 is a flow diagram illustrating an exemplary method that may be implemented by the network device in FIG. 8. An authentication request may be received from a (served or client) device where the authentication request includes a home network identifier, a (served or client) device identifier, and a service identifier 902. A device-specific (or subscription-specific) network connectivity root key may be obtained from a home subscriber server using the (served or client) device identifier 904.

An authentication and key agreement (AKA) exchange may be performed between the network device and the (served or client) device based on the device-specific network connectivity root key.

In a first alternative, the device-specific network connectivity root key may be provided to a second network device for subsequent generation of service-specific network connectivity root keys, based on the device-specific network connectivity root key 906.

In a second alternative, a service-specific network connectivity root key may be obtained/generated based on the device-specific network connectivity root key and the service identifier. The service-specific network connectivity root key may then be provided to a mobility management entity device service the (served or client) device.

Figure 10:
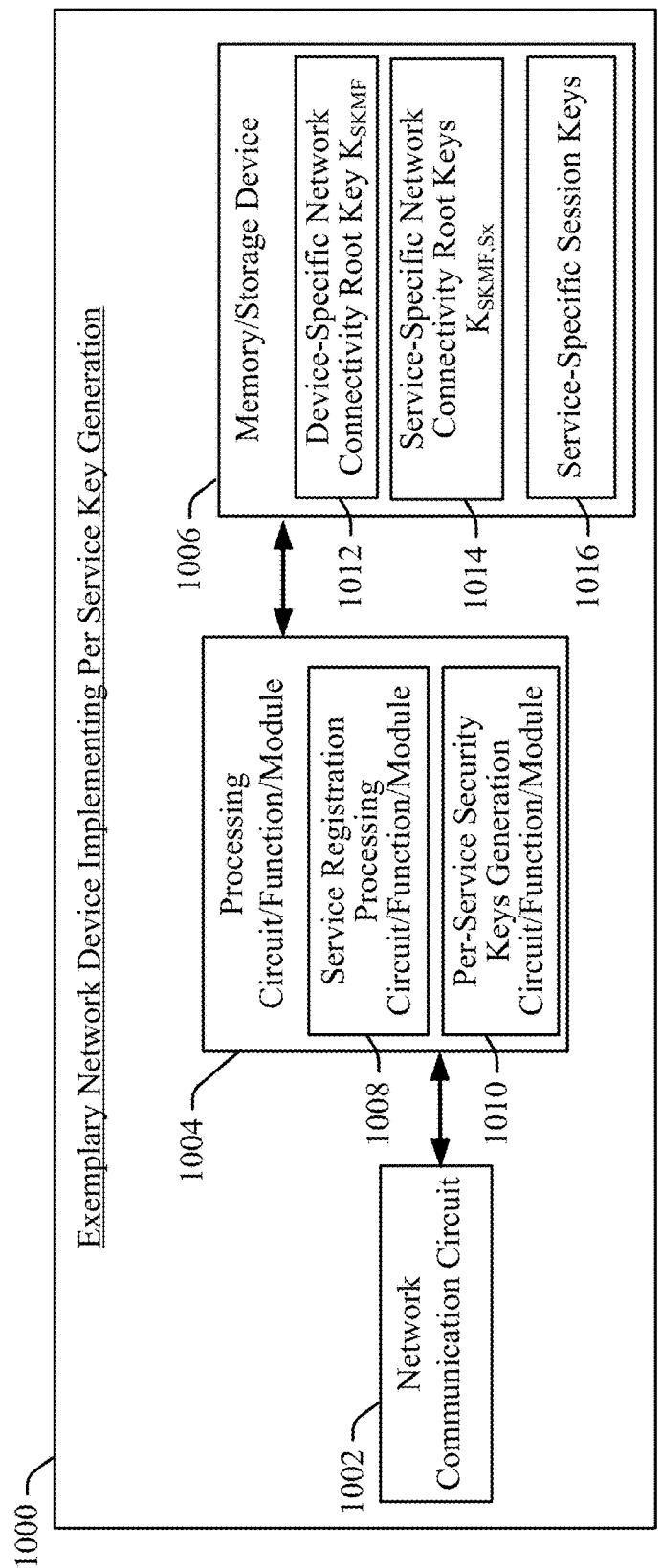
FIG. 10 is a block diagram illustrating an exemplary network device configured to implement a per-service key generation for distinct services running on a device.

Exemplary Network Device and Method Operational Thereon for Per-Service Security Key Generation FIG. 10 is a block diagram illustrating an exemplary network device configured to implement a per-service key generation for distinct services running on a (served or client) device. The network device 1000 may include a processing circuit, function, or module 1004 coupled to a network communication interface circuit 1002, and a memory/storage device 1006. The network communication circuit 1002 may serve to couple the network device 1000 to one or more (served or client) devices over a serving network. The processing circuit 1004 may include a service registration processing circuit, function, or module 1008 configured to perform service registration processing which results in the generation or acquisition of a first service-specific network connectivity root key. A per-service security keys generation circuit, function, and/or module 1010 may be configured to generate and/or store one or more service-specific session keys 1016 for the first service based on the first service-specific network connectivity root key.

Figure 11:
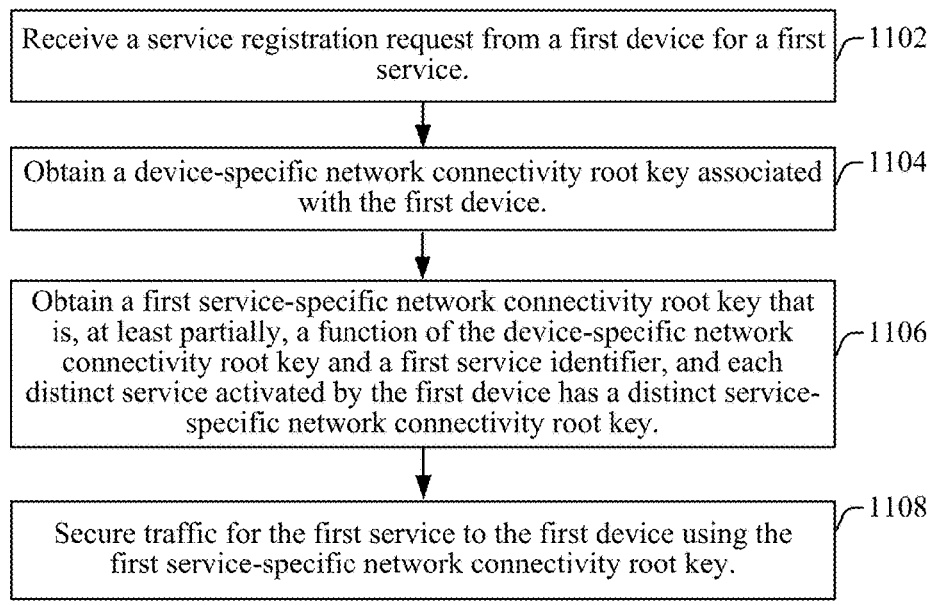
FIG. 11 is a flow diagram exemplary method that may be implemented by the network device in FIG. 10.

FIG. 11 is a flow diagram illustrating an exemplary method that may be implemented by the network device in FIG. 10. A service registration request may be received from a first (served or client) device a first service 1102. A device-specific (or subscription-specific) network connectivity root key associated with the first (served or client) device may be obtained 1104. A first service-specific network connectivity root key may then be obtained (e.g., from the SKMF) or generated that is, at least partially, a function of the device-specific network connectivity root key and a first service identifier, and each distinct service activated by the first (served or client) device has a distinct service-specific network connectivity root key 1106. Traffic for the first service to the first (served or client) device may then be secured based on the first service-specific network connectivity root key 1108. In one example, only traffic in a control plane is secured based on the first service-specific network connectivity root key (e.g., using keys derived from the first service-specific network connectivity root key). The traffic may include the first service identifier.

In one implementation, a set of keys are further derived from the first service-specific network connectivity root key, where a first key from the set of keys serves to secure traffic at an access stratum of the network, and a second key from the set of keys serves to secure traffic at a non-access stratum of the network.

In another example, another service registration request may be received from the first (served or client) device for a second service. A second service-specific network connectivity root key is then obtained that is, at least partially, a function of the device-specific network connectivity root key and a first service identifier, and each distinct service activated by the first (served or client) device has a distinct service-specific network connectivity root key.

A session may also be established with the network, wherein a plurality of services operate over the same session but have distinct security keys.

Specific implementations shown and described are only examples and should not be construed as the only way to implement the present disclosure unless specified otherwise herein. It is readily apparent to one of ordinary skill in the art that the various examples in the present disclosure may be practiced by numerous other partitioning solutions.

One or more of the components, acts, features and/or functions described herein and illustrated in the drawings may be rearranged and/or combined into a single component, act, feature, or function or embodied in several components, acts, features, or functions. Additional elements, components, acts, and/or functions may also be added without departing from the invention. The algorithms described herein may also be efficiently implemented in software and/or embedded in hardware.

In the description, elements, circuits, functions, and modules may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It is readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of ordinary skill in the art would understand that information and signals may be represented using any of a variety of different technologies and techniques. For example, data, instructions, commands, information, signals, bits, symbols, and chips that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals, including a single data signal.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium," "computer-readable medium," and/or "processor-readable medium" may include, but are not limited to non-transitory mediums such as portable or fixed storage devices, optical storage devices, and various other mediums capable of storing, containing, or carrying instruction(s) and/or data. Thus, the various methods described herein may be fully or partially implemented by instructions and/or data that may be stored in a "machine-readable medium," "computer-readable medium," and/or "processor-readable medium" and executed by one or more processors, machines and/or devices.

Furthermore, embodiments may be implemented by hardware, software, firmware, middleware, microcode, or any combination thereof. When implemented in software, firmware, middleware, or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, elements, circuits, modules, functions, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration. A general-purpose processor, configured for executing embodiments described herein, is considered a special purpose processor for carrying out such embodiments. Similarly, a general-purpose computer is considered a special purpose computer when configured for carrying out embodiments described herein.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, circuits, functions, modules, and algorithm steps described in connection with the embodiments disclosed herein may be implemented as electronic hardware, computer software, or combinations of both. To clearly illustrate this interchangeability of hardware and software, various illustrative elements, components, blocks, circuits, functions, modules, and steps have been described above generally in terms of their functionality. Whether such functionality is implemented as hardware, software, or a combination thereof depends upon the particular application and design selections imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method operational at a device, comprising:
performing an authentication and key agreement (AKA) exchange with a first network entity operating on a network including submitting a first service identifier for a first service;
generating a device-specific network connectivity root key from the AKA exchange;
performing a service registration procedure for the first service through the network; and
obtaining a first service-specific network connectivity root key from the service registration procedure, wherein the first service-specific network connectivity root key is, at least partially, a function of the device-specific network connectivity root key and the first service identifier and is obtained using a key derivation function applied to the device-specific network connectivity root key and the first service identifier, and each distinct service activated by the device has a distinct service-specific network connectivity root key.

2. The method of claim 1, wherein the service registration procedure is performed concurrently with the AKA exchange by including the first service identifier as part of an AKA request.

3. The method of claim 1, wherein the service registration procedure is performed in a separate operation than the AKA exchange.

4. The method of claim 1, further comprising:
securing traffic for the first service based on the first service-specific network connectivity root key.

5. The method of claim 4, wherein only traffic in a control plane is secured based on the first service-specific network connectivity root key.

6. The method of claim 4, wherein the traffic includes the first service identifier.

7. The method of claim 1, wherein obtaining the first service-specific network connectivity root key includes
generating a local instance of the first service-specific network connectivity root key at the device.

8. The method of claim 1, further comprising:
sending a first attachment request including the first service identifier to initiate the AKA exchange.

9. The method of claim 8, further comprising:
receiving a first key set identifier that serves to identify the device-specific network connectivity root key.

10. The method of claim 9, further comprising:
receiving a second key set identifier that serves to identify the first service-specific network connectivity root key.

11. The method of claim 9, further comprising:
sending a second attachment request including a second service identifier and the first key set identifier to initiate a service registration procedure for a second service through the network, the second service associated with the second service identifier; and
obtaining a second service-specific network connectivity root key that is, at least partially, a function of the device-specific network connectivity root key and the second service identifier.

12. The method of claim 11, further comprising:
receiving a second key set identifier that serves to identify the second service-specific network connectivity root key.

13. The method of claim 1, further comprising:
performing another service registration procedure for a second service; and
obtaining a second service-specific network connectivity root key from the another service registration procedure, wherein the second service-specific network connectivity root key is, at least partially, a function of the device-specific network connectivity root key and a second service identifier.

14. The method of claim 1, further comprising:
deriving a set of keys from the first service-specific network connectivity root key;
securing traffic at an access stratum of the network using a first key from the set of keys; and
securing traffic at a non-access stratum of the network using a second key from the set of keys.

15. The method of claim 1, wherein obtaining the device-specific network connectivity root key includes:
generating the device-specific network connectivity root key based on a secret root key and a key derivation algorithm identified during the AKA exchange.

16. The method of claim 1, wherein the service registration procedure is performed with a second network entity.

17. The method of claim 1, wherein the service registration procedure avoids performing a full AKA exchange.

18. The method of claim 1, further comprising:
establishing a wireless communication link or session with the network, wherein a plurality of services operate over the wireless communication link or session using distinct service-specific network connectivity root keys.

19. A device comprising:
a wireless communication circuit for communicating over a network; and
a processing circuit coupled to the wireless communication circuit, the processing circuit configured to
perform an authentication and key agreement (AKA) exchange with a first network entity via the wireless communication circuit including submitting a first service identifier for a first service;
generating a device-specific network connectivity root key from the AKA exchange;
perform a service registration procedure for the first service through the network; and
obtain a first service-specific network connectivity root key from the service registration procedure, wherein the first service-specific network connectivity root key is, at least partially, a function of the device-specific network connectivity root key and the first service identifier and is obtained using a key derivation function applied to the device-specific network connectivity root key and the first service identifier, and each distinct service activated by the device has a distinct service-specific network connectivity root key.

20. The device of claim 19, wherein the service registration procedure is performed concurrently with the AKA exchange by including a service identifier as part of an AKA request.

21. The device of claim 19, wherein the service registration procedure is performed in a separate operation than the AKA exchange.

22. The device of claim 19, wherein the processing circuit is further configured to:
secure traffic for the first service based on the first service-specific network connectivity root key.

23. The device of claim 22, wherein only traffic in a control plane is secured based on the first service-specific network connectivity root key.

24. The device of claim 22, wherein the traffic includes the first service identifier.

25. The device of claim 19, wherein the processing circuit is further configured to:
receive a first key set identifier that serves to identify the device-specific network connectivity root key.

26. The device of claim 19, wherein the processing circuit is further configured to:
receive a second key set identifier that serves to identify the first service-specific network connectivity root key.

27. The device of claim 19, wherein the processing circuit is further configured to:
derive a set of keys from the first service-specific network connectivity root key;
secure traffic at an access stratum of the network using a first key from the set of keys; and
secure traffic at a non-access stratum of the network using a second key from the set of keys.

28. The device of claim 19, wherein obtaining the device-specific network connectivity root key includes:
generating the device-specific network connectivity root key based on a secret root key and a key derivation algorithm identified during the AKA exchange.

29. The device of claim 19, wherein the service registration procedure is performed with a second network entity.

30. The device of claim 19, wherein the processing circuit is further configured to:
send a first attachment request including the first service identifier to initiate the AKA exchange.

31. The device of claim 30, wherein the attachment request further including a first key set identifier that serves to identify the device-specific network connectivity root key.

32. The device of claim 31, wherein the attachment request further including a second key set identifier that serves to identify the first service-specific network connectivity root key.

33. The device of claim 31, wherein the processing circuit is further configured to:
send a second attachment request including a second service identifier and the first key set identifier to initiate a service registration procedure for a second service through the network, the second service associated with the second service identifier; and
obtain a second service-specific network connectivity root key that is, at least partially, a function of the device-specific network connectivity root key and the second service identifier.

34. The device of claim 33, wherein the processing circuit is further configured to: receive a second key set identifier that serves to identify the second service-specific network connectivity root key.

35. The device of claim 19, wherein the processing circuit is further configured to:
perform a second service registration procedure for a second service; and
obtain a second service-specific network connectivity root key from the second service registration procedure, wherein the second service-specific network connectivity root key is, at least partially, a function of the device-specific network connectivity root key and a second service identifier.

36. The device of claim 35, wherein the second service registration procedure avoids performing a full AKA exchange.

37. A method operational at a network device, comprising:
receiving an authentication request from a first device, where the authentication request includes a home network identifier, a first device identifier, and a service identifier;

obtaining a device-specific network connectivity root key from a home subscriber server using the first device identifier; and providing the device-specific network connectivity root key to a second network device for subsequent generation of a service-specific network connectivity root key where the service-specific network connectivity root key is obtained using a key derivation function applied to the device-specific network connectivity root key and the service identifier, and wherein each distinct service has a distinct service-specific network connectivity root key.

38. The method of claim 37, wherein additional distinct service-specific network connectivity root keys are obtained using the key derivation function applied to the device-specific network connectivity root key and corresponding distinct service identifiers.

39. The method of claim 37, further comprising:

performing an authentication and key agreement (AKA) exchange with the first device based on the device-specific network connectivity root key.

40. The method of claim 37, further comprising:

obtaining a service-specific network connectivity root key based on the device-specific network connectivity root key and the service identifier; and providing the service-specific network connectivity root key to a mobility management entity device.

41. The method of claim 37, wherein the authentication request further includes a first key set identifier that serves to identify the device-specific network connectivity root key.

42. The method of claim 41, further comprising:

obtaining a first key set identifier that serves to identify the device-specific network connectivity root key; and obtaining a second key set identifier that serves to identify a service-specific network connectivity root key based on the device-specific network connectivity root key and the service identifier.

43. A network device comprising:

a network communication circuit for communicating over a network to one or more devices; and a processing circuit coupled to the network communication circuit, the processing circuit configured to perform an authentication and key agreement (AKA) exchange with a first device including receiving a service identifier for a service from the first device;

obtain a device-specific network connectivity root key from the AKA exchange; and provide the device-specific network connectivity root key and the service identifier to a second network device for subsequent generation of a service-specific network connectivity root key based on the device-specific network connectivity root key and the service identifier, where the service-specific network connectivity root key is obtained using a key derivation function applied to the device-specific network connectivity root key and the service identifier.

44. A method operational at a network device, comprising:

receiving a service registration request from a first device for a first service including receiving a first service identifier for the first service from the first device;

obtaining a device-specific network connectivity root key associated with the first device; and obtaining a first service-specific network connectivity root key that is, at least partially, a function of the device-specific network connectivity root key and the first service identifier and is obtained using a key derivation function applied to the device-specific network connectivity root key and the first service identifier, and each distinct service activated by the first device has a distinct service-specific network connectivity root key.

45. The method of claim 44, further comprising:

securing traffic for the first service to the first device based on the first service-specific network connectivity root key.

46. The method of claim 45, wherein only traffic in a control plane is secured based on the first service-specific network connectivity root key.

47. The method of claim 45, wherein the traffic includes the first service identifier.

48. The method of claim 44, further comprising:

deriving a set of keys from the first service-specific network connectivity root key, where a first key from the set of keys serves to secure traffic at an access stratum of the network, and a second key from the set of keys serves to secure traffic at a non-access stratum of the network.

49. The method of claim 45, further comprising:

obtaining at least one of:

a first key set identifier that serves to identify the device-specific network connectivity root key; or a second key set identifier that serves to identify the first service-specific network connectivity root key.

50. The method of claim 45, further comprising:

sending at least one of:

(a) a first key set identifier that serves to identify the device-specific network connectivity root key; or (b) a second key set identifier that serves to identify the first service-specific network connectivity root key to the first device.

51. The method of claim 44, further comprising:

receiving a second service registration request from the first device for a second service; and obtaining a second service-specific network connectivity root key that is, at least partially, a function of the device-specific network connectivity root key and a first second service identifier.

52. The method of claim 51, wherein the second service registration request includes the device-specific network connectivity root key.

53. The method of claim 44, further comprising:

establishing a session with the network, wherein a plurality of services operate over the same session using distinct service-specific network connectivity root keys.

54. A network device comprising:

a network communication circuit for communicating over a network to one or more devices; and a processing circuit coupled to the network communication circuit, the processing circuit configured to receive a service registration request from a first device for a first service including receiving a first service identifier for the first service from the first device;

obtain a device-specific network connectivity root key associated with the first device; and obtain a first service-specific network connectivity root key that is, at least partially, a function of the device-specific network connectivity root key and the first service identifier and is obtained using a key derivation function applied to the device-specific network connectivity root key and the first service identifier, and each distinct service activated by the first device has a distinct service-specific network connectivity root key.

55. The network device of claim 54, wherein the processing circuit is further configured to:
secure traffic for the first service to the first device using the first service-specific network connectivity root key.

56. The network device of claim 55, wherein only traffic in a control plane is secured based on the first service-specific network connectivity root key.

57. The network device of claim 55, wherein the traffic includes the first service identifier.

58. The network device of claim 54, wherein the processing circuit is further configured to:
derive a set of keys from the first service-specific network connectivity root key, where a first key from the set of keys serves to secure traffic at an access stratum of the network, and a second key from the set of keys serves to secure traffic at a non-access stratum of the network.

59. The network device of claim 54, wherein the processing circuit is further configured to:
obtain at least one of:
a first key set identifier that serves to identify the device-specific network connectivity root key; or
a second key set identifier that serves to identify the first service-specific network connectivity root key.

60. The network device of claim 54, wherein the processing circuit is further configured to:
send at least one of:
(a) a first key set identifier that serves to identify the device-specific network connectivity root key; or
(b) a second key set identifier that serves to identify the first service-specific network connectivity root key to the first device.

61. The network device of claim 54, wherein the processing circuit is further configured to:
receive a second service registration request from the first device for a second service; and
obtain a second service-specific network connectivity root key that is, at least partially, a function of the device-specific network connectivity root key and a second service identifier.

62. The network device of claim 61, wherein the second service registration request includes the device-specific network connectivity root key.

63. The network device of claim 54, wherein the processing circuit is further configured to:
establish a session with the first device, wherein a plurality of services operate over the same session using distinct service-specific network connectivity root keys.

* * * * *